US011476486B2

(12) United States Patent
Blanco Gutierrez et al.

(10) Patent No.: US 11,476,486 B2
(45) Date of Patent: Oct. 18, 2022

(54) FUEL CELL STAGING FOR MOLTEN CARBONATE FUEL CELLS

(71) Applicants: ExxonMobil Technology and Engineering Company, Annandale, NJ (US); FUELCELL ENERGY, INC., Danbury, CT (US)

(72) Inventors: Rodrigo F. Blanco Gutierrez, Berkeley Heights, NJ (US); Eric B. Shen, Great Falls, VA (US); Carla S. Pereira, Bridgewater, NJ (US); Keith E. Davis, Southbury, CT (US); Hossein Ghezel-Ayagh, New Milford, CT (US)

(73) Assignees: EXXONMOBIL TECHNOLOGY AND ENGINEERING COMPANY, Annandale, NJ (US); FUELCELL ENERGY, INC., Danbury, CT (US)

( * ) Notice: Subject to any disclaimer, the term of this patent is extended or adjusted under 35 U.S.C. 154(b) by 249 days.

(21) Appl. No.: 16/695,286

(22) Filed: Nov. 26, 2019

(65) Prior Publication Data

US 2020/0176799 A1 Jun. 4, 2020

Related U.S. Application Data

(60) Provisional application No. 62/773,452, filed on Nov. 30, 2018.

(51) Int. Cl.
*H01M 8/14* (2006.01)
*H01M 8/249* (2016.01)
(Continued)

(52) U.S. Cl.
CPC ........ *H01M 8/145* (2013.01); *H01M 8/04589* (2013.01); *H01M 8/04805* (2013.01);
(Continued)

(58) Field of Classification Search
CPC .......... H01M 8/04462; H01M 8/0447; H01M 8/04447; H01M 8/04455; H01M 8/04552;
(Continued)

(56) References Cited

U.S. PATENT DOCUMENTS 3,615,839 A 10/1971 Thompson et al.
3,970,474 A 7/1976 Anbar et al.
(Continued)

FOREIGN PATENT DOCUMENTS

CA 2120858 A1 10/1994
CA 2325072 A1 4/2002
(Continued)

OTHER PUBLICATIONS

Campanari et al., "Using MCFC for high efficiency CO2 capture from natural gas combined cycles: Comparison of internal and external reforming," Feb. 20, 2013, Applied Energy, 112, 772-783. (Year: 2013).*

(Continued)

*Primary Examiner* — Ula C Ruddock
*Assistant Examiner* — Matthew W Van Oudenaren
(74) *Attorney, Agent, or Firm* — Shook, Hardy & Bacon L.L.P.

(57) ABSTRACT

Systems and methods are provided for using fuel cell staging to reduce or minimize variations in current density when operating molten carbonate fuel cells with elevated $CO_2$ utilization. The fuel cell staging can mitigate the amount of alternative ion transport that occurs when operating molten carbonate fuel cells under conditions for elevated $CO_2$ utilization.

19 Claims, 6 Drawing Sheets

(51) Int. Cl.
*H01M 8/04828* (2016.01)
*H01M 8/04537* (2016.01)
*H01M 8/04791* (2016.01)
*H01M 8/0637* (2016.01)
*H01M 8/04858* (2016.01)

(52) U.S. Cl.
CPC .... *H01M 8/04843* (2013.01); *H01M 8/04952* (2016.02); *H01M 8/0637* (2013.01); *H01M 8/249* (2013.01); *H01M 2008/147* (2013.01)

(58) Field of Classification Search
CPC ......... H01M 8/04559; H01M 8/04582; H01M 8/04589; H01M 8/04619; H01M 8/04798; H01M 8/04805; H01M 8/04873; H01M 8/0488; H01M 8/04902; H01M 8/0491; H01M 8/04932; H01M 8/0494; H01M 8/145; H01M 8/04951; H01M 8/04952; H01M 8/0637; H01M 8/249; H01M 2008/147
See application file for complete search history.

(56) References Cited

U.S. PATENT DOCUMENTS

| | | | |
|---|---|---|---|
| 4,041,210 A | 8/1977 | Van Dine | |
| 4,160,663 A | 7/1979 | Hsieh | |
| 4,772,634 A | 9/1988 | Farooque | |
| 4,800,052 A | 1/1989 | Swarr et al. | |
| 4,810,595 A | 3/1989 | Kahara et al. | |
| 4,917,971 A | 4/1990 | Farooque | |
| 4,921,765 A | 5/1990 | Gmeindl et al. | |
| 4,983,472 A | 1/1991 | Katz et al. | |
| 4,995,807 A | 2/1991 | Rampley et al. | |
| 5,039,579 A | 8/1991 | Kinoshita | |
| 5,071,719 A | 12/1991 | Rostrup-Nielsen et al. | |
| 5,079,103 A | 1/1992 | Schramm | |
| 5,082,752 A | 1/1992 | Koga et al. | |
| 5,084,362 A | 1/1992 | Farooque | |
| 5,134,043 A | 7/1992 | Nakazawa | |
| 5,169,717 A | 12/1992 | Topsoe | |
| 5,198,311 A | 3/1993 | Nakazawa et al. | |
| 5,208,113 A | 5/1993 | Kinoshita | |
| 5,232,793 A | 8/1993 | Miyauchi et al. | |
| 5,376,472 A | 12/1994 | Hartvigsen et al. | |
| 5,380,600 A | 1/1995 | Hansen et al. | |
| 5,413,878 A | 5/1995 | Williams et al. | |
| 5,417,051 A | 5/1995 | Ankersmit et al. | |
| 5,422,195 A | 6/1995 | Bernard | |
| 5,468,573 A | 11/1995 | Bregoli et al. | |
| 5,470,670 A | 11/1995 | Yasumoto et al. | |
| 5,518,827 A | 5/1996 | Matsumura et al. | |
| 5,541,014 A | 7/1996 | Micheli et al. | |
| 5,554,453 A | 9/1996 | Steinfeld et al. | |
| 5,616,430 A | 4/1997 | Aoyama | |
| 5,688,292 A | 11/1997 | Antolini | |
| 5,736,026 A | 4/1998 | Patel et al. | |
| 5,833,734 A | 11/1998 | Cip et al. | |
| 6,030,718 A | 2/2000 | Fuglevand et al. | |
| 6,063,141 A | 5/2000 | Wendt et al. | |
| 6,083,636 A | 7/2000 | Hsu | |
| 6,090,312 A | 7/2000 | Ziaka et al. | |
| 6,126,718 A | 10/2000 | Sawa et al. | |
| 6,162,556 A | 12/2000 | Vollmar et al. | |
| 6,267,799 B1 | 7/2001 | Innes et al. | |
| 6,322,916 B1 | 11/2001 | Hemmes et al. | |
| 6,365,290 B1 | 4/2002 | Ghezel-Ayagh et al. | |
| 6,383,251 B1 | 5/2002 | Sherwood | |
| 6,383,677 B1 | 5/2002 | Allen | |
| 6,420,062 B1 | 7/2002 | Prohaska et al. | |
| 6,492,045 B1 | 12/2002 | Blanchet et al. | |
| 6,509,113 B2 | 1/2003 | Keegan | |
| 6,524,356 B2 | 2/2003 | Fournier et al. | |
| 6,648,942 B2 | 11/2003 | Hoffman et al. | |
| 6,896,988 B2 | 5/2005 | Wang et al. | |
| 7,311,986 B2 | 12/2007 | Hsu | |
| 7,396,603 B2 | 7/2008 | Farooque et al. | |
| 7,503,178 B2 | 3/2009 | Bucker et al. | |
| 7,563,527 B2 | 7/2009 | Tanaka et al. | |
| 7,862,938 B2 | 1/2011 | Ghezel-Ayagh | |
| 7,914,765 B2 | 3/2011 | McLean et al. | |
| 7,939,219 B2 | 5/2011 | Johnsen et al. | |
| 8,047,007 B2 | 11/2011 | Zubrin et al. | |
| 8,080,344 B2 | 12/2011 | Skok et al. | |
| 8,142,943 B2 | 3/2012 | McElroy et al. | |
| 8,349,504 B1 | 1/2013 | Radovich | |
| 8,557,468 B2 | 10/2013 | Hilmi et al. | |
| 8,562,903 B2 | 10/2013 | Hayton et al. | |
| 8,802,332 B2 | 8/2014 | Correa et al. | |
| 8,822,090 B2 | 9/2014 | Ma et al. | |
| 9,077,007 B2 | 7/2015 | Berlowitz et al. | |
| 2002/0106549 A1 | 8/2002 | Cooper et al. | |
| 2002/0142208 A1 | 10/2002 | Keefer et al. | |
| 2003/0008183 A1 | 1/2003 | Hsu | |
| 2003/0096155 A1 | 5/2003 | Hong et al. | |
| 2003/0143448 A1 | 7/2003 | Keefer | |
| 2003/0219637 A1 | 11/2003 | Coors | |
| 2004/0038089 A1 | 2/2004 | Hoffjann et al. | |
| 2004/0038115 A1 | 2/2004 | Johnsen et al. | |
| 2004/0043274 A1 | 3/2004 | Scartozzi et al. | |
| 2004/0202914 A1 | 10/2004 | Sridhar et al. | |
| 2005/0079395 A1 | 4/2005 | Varatharajan et al. | |
| 2005/0106429 A1 | 5/2005 | Keefer | |
| 2005/0112425 A1 | 5/2005 | Hsu | |
| 2005/0123810 A1 | 6/2005 | Balan | |
| 2005/0164051 A1 | 7/2005 | Venkataraman et al. | |
| 2005/0181247 A1 | 8/2005 | Foger et al. | |
| 2006/0127718 A1 | 6/2006 | Kurashima et al. | |
| 2006/0159967 A1 | 7/2006 | Huijsmans et al. | |
| 2006/0204806 A1 | 9/2006 | Takada et al. | |
| 2006/0251940 A1 | 11/2006 | Bandhauer et al. | |
| 2006/0269830 A1* | 11/2006 | Johnsen ............... H01M 8/144 429/442 |
| 2007/0017367 A1 | 1/2007 | McElroy et al. | |
| 2007/0072027 A1 | 3/2007 | Sridhar et al. | |
| 2007/0099038 A1 | 5/2007 | Galloway | |
| 2007/0184310 A1 | 8/2007 | Kim et al. | |
| 2007/0224467 A1 | 9/2007 | Nervi et al. | |
| 2007/0287046 A1 | 12/2007 | Koda et al. | |
| 2008/0057361 A1 | 3/2008 | Moon et al. | |
| 2008/0124255 A1 | 5/2008 | Johnston | |
| 2008/0160358 A1 | 7/2008 | Parodi et al. | |
| 2009/0029204 A1 | 1/2009 | Venkataraman | |
| 2009/0042070 A1 | 2/2009 | Brown, Jr. et al. | |
| 2009/0169452 A1 | 7/2009 | Constantz et al. | |
| 2009/0208784 A1 | 8/2009 | Perry et al. | |
| 2009/0317667 A2 | 12/2009 | Nervi et al. | |
| 2009/0317669 A1 | 12/2009 | Hildebrandt et al. | |
| 2010/0015486 A1 | 1/2010 | Yoshiba | |
| 2010/0148410 A1 | 6/2010 | Bleifuss et al. | |
| 2010/0239924 A1 | 9/2010 | McElroy et al. | |
| 2011/0033771 A1 | 2/2011 | Bednarz et al. | |
| 2011/0104577 A1 | 5/2011 | Cui et al. | |
| 2011/0111315 A1 | 5/2011 | Cui et al. | |
| 2011/0117460 A1 | 5/2011 | Shin | |
| 2011/0154951 A1 | 6/2011 | Hiraoka | |
| 2011/0167821 A1 | 7/2011 | Baker et al. | |
| 2011/0171544 A1 | 7/2011 | Burmeister et al. | |
| 2011/0223500 A1 | 9/2011 | Uematsu et al. | |
| 2011/0223501 A1 | 9/2011 | Uematsu et al. | |
| 2012/0028145 A1 | 2/2012 | Boden et al. | |
| 2012/0171588 A1 | 7/2012 | Fan et al. | |
| 2012/0214076 A1 | 8/2012 | Hakala | |
| 2012/0251898 A1 | 10/2012 | Lehar et al. | |
| 2012/0295180 A1 | 11/2012 | Homma | |
| 2012/0325053 A1 | 12/2012 | Grossi | |
| 2013/0014484 A1 | 1/2013 | Caprile et al. | |
| 2013/0081516 A1 | 4/2013 | Simmons | |
| 2013/0177824 A1 | 7/2013 | Cui et al. | |
| 2013/0209904 A1 | 8/2013 | Liu et al. | |
| 2013/0337360 A1 | 12/2013 | Mahoney et al. | |
| 2014/0242482 A1 | 8/2014 | Cui et al. | |
| 2014/0260310 A1 | 9/2014 | Berlowitz et al. | |

(56) References Cited

U.S. PATENT DOCUMENTS

| | | |
|---|---|---|
| 2015/0093665 A1 | 4/2015 | Barckholtz et al. |
| 2015/0280265 A1 | 10/2015 | McLarty |
| 2016/0190613 A1 | 6/2016 | Shiokawa et al. |
| 2017/0040620 A1 | 2/2017 | Uwani |
| 2017/0191139 A1 | 7/2017 | Berlowitz et al. |
| 2017/0271701 A1 | 9/2017 | Berlowitz et al. |
| 2019/0051919 A1 | 2/2019 | Yoshizaki et al. |
| 2019/0131636 A1 | 5/2019 | Lösche-Ter Horst et al. |
| 2019/0198904 A1 | 6/2019 | Ichikawa et al. |
| 2019/0386317 A1 | 12/2019 | Poizeau et al. |
| 2020/0020965 A1 | 1/2020 | Wang et al. |
| 2020/0099066 A1 | 3/2020 | Ghezel-Ayagh |
| 2020/0176783 A1 | 6/2020 | Rosen et al. |
| 2020/0176787 A1 | 6/2020 | Geary et al. |
| 2020/0176795 A1 | 6/2020 | Johnson |

FOREIGN PATENT DOCUMENTS

| | | |
|---|---|---|
| CA | 2551219 A1 | 1/2007 |
| CA | 2694153 A1 | 9/2011 |
| CN | 101098022 A | 1/2008 |
| CN | 201902241 U | 7/2011 |
| CN | 207542331 U | 6/2018 |
| DE | 40 05 468 A1 | 8/1991 |
| DE | 19515669 A1 | 10/1996 |
| DE | 19545186 A1 | 6/1997 |
| DE | 196 09 313 C1 | 9/1997 |
| DE | 199 41 724 A1 | 8/2000 |
| DE | 100 16 847 A1 | 10/2001 |
| DE | 10 2006 047 823 A1 | 2/2008 |
| DE | 10 2008 019 981 A1 | 10/2009 |
| EP | 0 170 277 A2 | 2/1986 |
| EP | 0 180 941 A2 | 5/1986 |
| EP | 0 473 153 A2 | 3/1992 |
| EP | 0 502 125 A1 | 9/1992 |
| EP | 0 678 926 A1 | 10/1995 |
| EP | 0 685 897 A1 | 12/1995 |
| EP | 0 691 701 A1 | 1/1996 |
| EP | 1 670 090 A1 | 6/2006 |
| EP | 1 926 171 A1 | 5/2008 |
| EP | 2 182 572 A1 | 5/2010 |
| EP | 2 991 139 A1 | 3/2016 |
| JP | S56-69775 A | 6/1981 |
| JP | H02-075164 A | 3/1990 |
| JP | H03-001447 A | 1/1991 |
| JP | H04-039868 A | 2/1992 |
| JP | H05-029009 A | 2/1993 |
| JP | H05-163180 A | 6/1993 |
| JP | H05-503606 A | 6/1993 |
| JP | H08-96824 A | 4/1996 |
| JP | H08-138701 A | 5/1996 |
| JP | H10-172595 A | 6/1998 |
| JP | H11-91427 A | 4/1999 |
| JP | H11-312527 A | 11/1999 |
| JP | 2002-151111 A | 5/2002 |
| JP | 2002-319248 A | 10/2002 |
| JP | 2004-014124 A | 1/2004 |
| JP | 2004-079495 A | 3/2004 |
| JP | 2004-186074 A | 7/2004 |
| JP | 2005-190981 A | 7/2005 |
| JP | 2006-073316 A | 3/2006 |
| JP | 2007-287580 A | 11/2007 |
| JP | 2008-527617 A | 7/2008 |
| JP | 2008-192425 A | 8/2008 |
| JP | 2008-287940 A | 11/2008 |
| JP | 2009-043487 A | 2/2009 |
| JP | 2013-045535 A1 | 3/2013 |
| KR | 10-0651270 B1 | 11/2006 |
| KR | 10-0827954 B1 | 5/2008 |
| KR | 2009-0067426 A | 6/2009 |
| KR | 2009-0124824 A | 12/2009 |
| KR | 2010-0032974 A | 3/2010 |
| KR | 2011-0029963 A | 3/2011 |
| KR | 2011-0032443 A | 3/2011 |
| KR | 2011-0077775 A | 7/2011 |
| KR | 2012-0050319 A | 5/2012 |
| KR | 2014-0085839 A | 7/2014 |
| KR | 2015-0066314 A | 6/2015 |
| KR | 2016-0041309 A | 4/2016 |
| NL | 1008883 C2 | 10/1999 |
| WO | 91/08595 A1 | 6/1991 |
| WO | 97/21257 A2 | 6/1997 |
| WO | 97/33828 A1 | 9/1997 |
| WO | 00/31815 A1 | 6/2000 |
| WO | 02/069430 A2 | 9/2002 |
| WO | 02/070402 A2 | 9/2002 |
| WO | 2002/103833 A1 | 12/2002 |
| WO | 2003/063276 A2 | 7/2003 |
| WO | 2004/013924 A2 | 2/2004 |
| WO | 2005/001977 A1 | 1/2005 |
| WO | 2006/072262 A1 | 7/2006 |
| WO | 2008/036169 A2 | 3/2008 |
| WO | 2010/044113 A1 | 4/2010 |
| WO | 2010/067223 A1 | 6/2010 |
| WO | 2010/125443 A1 | 11/2010 |
| WO | 2010/147885 A1 | 12/2010 |
| WO | 2010/147886 A1 | 12/2010 |
| WO | 2011/077224 A1 | 6/2011 |
| WO | 2012/091096 A1 | 7/2012 |
| WO | 2012/128928 A1 | 9/2012 |
| WO | 2012/176176 A1 | 12/2012 |
| WO | 2012/176177 A1 | 12/2012 |
| WO | 2017/223218 A1 | 12/2017 |

OTHER PUBLICATIONS

"Heat of Combustion", Wikipedia, Retrieved from Internet URL: http://en.wikipediaorg/wiki/Lower_heating_value, accessed on Jun. 24, 2014, pp. 8.

"Lower and Higher Heating Values of Fuels", Hydrogen Data Resource Center: Hydrogen Calculator, p. 1 (2012).

"Molten Carbonate Fuel Cell Technology", Fossil Energy—U.S. Department of Energy, pp. 2 (Jan. 31, 2011).

"Test and Quality Assurance Plan: FuelCell Energy, Inc.—DFC 300A Molten Carbonate Fuel Cell Combined Heat and Power System", Greenhouse Gas Technology Center, pp. 1-42 (Mar. 2007).

Avidan, A. A., "Gasoline and Distillate Fuels from Methanol", Elsevier Science Publishers B.V, pp. 307-323 (1988).

Appleby A. J., and Selman, J. R., "Current Technology of PAFC, MCFC and SOFC Systems: Status of Present Fuel Cell Power Plants", Electrochemical Hydrogen Technologies, pp. 425-495 (Jan. 1, 1990).

Appleby, A. J., "Fuel Cells and Hydrogen Fuel", International Journal of Hydrogen Energy, vol. 19, No. 2, pp. 175-180 (1994).

Amorelli, A., et al., "An experimental investigation into the use of molten carbonate fuel cells to capture CO2 from gas turbine exhaust gases", Second annual conference on Carbon Sequestration, pp. 1-9 (May 5-8, 2003).

Amorelli, A., et al., "An experimental investigation into the use of molten carbonate fuel cells to capture CO2 from gas turbine exhaust gases", Energy, vol. 29, pp. 1279-1284 (2004).

Abu-Zahra, M. R.M, et al.,"CO2 capture from power plants: Part I: A parametric study of the technical performance based on monoethanolamine", International Journal of Greenhouse Gas Control, vol. 1, pp. 37-46 (2007).

Appl, M., "Ammonia, 3. Production Plants", Ullmann'S Encyclopedia of Industrial Chemistry, vol. 3, pp. 1-35 (2012).

Bianchi A., et al., "Bimodal Pore Size Distribution in MCFC Cathode Structure", Extended Abstracts, Electrochemical Society, vol. 95/01, pp. 858-859 (May 1995).

Cavallaro, S., et al., "Syngas and electricity production by an integrated autothermal reforming/molten carbonate fuel cell system", Journal of Power Sources, vol. 76, pp. 190-196 (1998).

Chiesa, P., et al., "A Comparative Analysis of IGCCs with CO2 Sequestration", Greenhouse Gas Control Technologies, pp. 107-112 (1999).

Campanari, S., "Carbon Dioxide separation from high temperature fuel cell power plants", Journal of Power Sources, vol. 112, pp. 273-289 (2002).

(56) References Cited

OTHER PUBLICATIONS

Campanari, S., et al., "CO2 capture from combined cycles integrated with Molten Carbonate Fuel Cells", International Journal of Greenhouse Gas Control, vol. 4, pp. 441-451 (2010).
Campanari, S., et al., "Application of MCFCs for active CO2 capture within natural gas combined cycles", Energy Procedia, vol. 4, pp. 1235-1242 (2011).
Caprile, L., et al., "Carbon capture: Energy wasting technologies or the MCFCs challenge?", International Journal of Hydrogen Energy, vol. 36, pp. 10269-10277 (2011).
Chiesa, P., et al., "CO2 cryogenic separation from combined cycles integrated with molten carbonate fuel cells", International Journal of Hydrogen Energy, vol. 36, pp. 10355-10365 (2011).
Desideri, U., et al., "MCFC-based CO2 capture system for small scale CHP plants", International Journal of Hydrogen Energy, vol. 37, pp. 19295-19303 (2012).
Ghezel-Ayagh, H., "High Efficiency Direct FuelCell/Turbine® Power Plant", Project Fact Sheet, Fuel Cell Energy, pp. 3 (2011).
Ghezel-Ayagh, H., "Electrochemical Membrane for CO2 Capture and Power Generation", Presentation at the 2012 NETL CO2 Capture Technology Meeting, Fuel Cell Energy, pp. 12 (Jul. 9, 2012).
Giddey, S., et al., "A comprehensive review of direct carbon fuel cell technology", Progress in Energy Combustion Science, vol. 38, pp. 360-399 (2012).
Keil, F. J., "Methanol-to-hydrocarbons: process technology", Microporous and Mesoporous Materials, vol. 29, pp. 49-66 (1999).
Kim, D. H., et al., "Numerical studies of a separator for stack temperature control in a molten carbonate fuel cell", International Journal of Hydrogen Energy, vol. 36, pp. 8499-8507 (2011).
Lowe, C., et al., "Technology Assessment of Hydrogen Firing of Process Heaters", Energy Procedia, ScienceDirect, vol. 4, pp. 1058-1065 (2011).
Morita, H., et al., "Degradation Mechanism of Molten Carbonate Fuel Cell Based on Long-Term Performance: Long-Term Operation by Using Bench-Scale Cell and Post-Test Analysis of the Cell", Journal of Power Sources, vol. 195, pp. 6988-6996 (2010).
Manzolini, G., et al., "CO2 Separation from Combined Cycles Using Molten Carbonate Fuel Cells", Journal of Fuel Cell Science and Technology, vol. 9, pp. 011018-1 to 011018-8 (2012).
Naqvi, S. N., "Dimethyl Ether As Fuel", SRI Consulting Report, Report No. 245A, pp. 188 (Sep. 2005).
Pilatowsky, I., et al., "Thermodynamics Of Fuel Cells", Cogeneration Fuel Cell-Sorption Air Conditioning Systems, pp. 25-36 (2011).
Sugiura, K., et al., "The carbon dioxide concentrator by using MCFC", Journal of Power Sources, vol. 118, pp. 218-227 (2003).
Steynberg, A., "Gas loop for POX reformers : Figure 8", Studies in Surface Science and Catalysis: Fischer Tropsch Technology, vol. 152, pp. 8 (2004).
Verda, V., and Nicolin, F., "Thermodynamic and economic optimization of a MCFC-based hybrid system for the combined production of electricity and hydrogen", International Journal of Hydrogen Energy, vol. 35, pp. 794-806 (2010).
Wesoff, E., "Will FuelCell Energy Be The First Profitable Company In The Industry?", Greentech Media, pp. 3 (Dec. 15, 2011).
Zhou, W., et al., "Decrease of energy demand for bioethanol-based polygeneration system through case study", Applied Energy, vol. 95, pp. 305-311 (2012).
International Search Report and Written Opinion received for PCT Patent Application No. PCT/US2019/063296, dated Feb. 18, 2020, 11 pages.
International Search Report and Written Opinion received for PCT Patent Application No. PCT/US2019/063255, dated Mar. 4, 2020, 11 pages.
International Search Report and Written opinion received for PCT Patent Application No. PCT/US2019/063293, dated Mar. 13, 2020, 10 pages.
International Search Report and Written Opinion received for PCT Patent Application No. PCT/US2019/063301, dated Mar. 13, 2020, 9 pages.
International Search Report and Written Opinion received for PCT Patent Application No. PCT/US2019/063248, dated Mar. 13, 2020, 10 pages.
International Search Report and Written Opinion received for PCT Patent Application No. PCT/US2019/063434, dated Mar. 24, 2020, 11 pages.
International Search Report and Written Opinion received for PCT Patent Application No. PCT/US2019/063337, dated Mar. 31, 2020, 9 pages.
International Search Report and Written Opinion received for PCT Patent Application No. PCT/US2019/063304, dated Apr. 1, 2020, 11 pages.
International Search Report and Written Opinion received for PCT Patent Application No. PCT/US2019/063291, dated Aug. 18, 2020, 13 pages.
International Search Report and Written Opinion received for PCT Patent Application No. PCT/US2019/063345, dated Aug. 20, 2020, 13 pages.
International Search Report and Written Opinion received for PCT Patent Application No. PCT/US2019/063333, dated Nov. 25, 2020, 20 pages.
Campanari, S., et al., "Using MCFC for high efficiency CO2 capture from natural gas combined cycles: Comparison of internal and external reforming", Applied Energy, vol. 112, pp. 772-783 (2013).
Non-Final Office Action dated Jun. 16, 2021, in U.S. Appl. No. 16/695,356, 5 pages.
Non-Final Office Action dated Jul. 22, 2021, in U.S. Appl. No. 16/695,368, 8 pages.
Non-Final Office Action dated Aug. 3, 2021, in U.S. Appl. No. 16/695,276, 17 pages.
Non-Final Office Action dated Aug. 10, 2021, in U.S. Appl. No. 16/695,281, 15 pages.
Notice of Allowance dated Aug. 17, 2021, in U.S. Appl. No. 16/695,335, 12 pages.
Final Office Action dated Nov. 15, 2021 in U.S. Appl. No. 16/695,368, 5 pages.
Notice of Allowance dated Nov. 23, 2021 in U.S. Appl. No. 16/695,356, 15 pages.
Final Office Action dated Dec. 21, 2021 in U.S. Appl. No. 16/695,281, 12 pages.
Final Office Action dated Jan. 11, 2022 in U.S. Appl. No. 16/695,276, 17 pages.
Non-Final Office Action dated Jan. 20, 2022 in U.S. Appl. No. 16/695,280, 17 pages.
Non-Final Office Action dated Feb. 4, 2022 in U.S. Appl. No. 16/695,278, 18 pages.
Notice of Allowance dated Feb. 11, 2022 in U.S. Appl. No. 16/695,368, 7 pages.
Non-Final Office Action dated Mar. 16, 2022 in U.S. Appl. No. 16/695,362, 11 pages.
Notice of Allowance dated Apr. 19, 2022 in U.S. Appl. No. 16/695,349, 9 pages.
Canadian Office Action received for Canadian Patent Application No. 3,121,537, dated Mar. 21, 2022, 4 pages.
Canadian Office Action received for Canadian Patent Application No. 3,121,538, dated Mar. 21, 2022, 4 pages.
Notice of Reasons for Refusal and Search Report received in JP Patent Application No. 2021-531318, dated May 31, 2022, 43 pages [Machine Translation Submitted].
Notice of Reasons for Refusal and Search Report received in JP Patent Application No. 2021-531317, dated May 31, 2022, 38 pages. [Machine Translation Submitted].
International Preliminary Report on Patentability received for PCT Application No. PCT/US2019/063291, dated Jun. 9, 2022, 8 pages.
International Preliminary Report on Patentability received for PCT Application No. PCT/US2019/063333, dated Jun. 9, 2022, 12 pages.
International Preliminary Report on Patentability received for PCT Application No. PCT/US2019/063345, dated Jun. 9, 2022, 7 pages.
Non-Final Office Action dated May 10, 2022 in U.S. Appl. No. 16/696,821, 8 pages.
Final Office Action dated Jul. 25, 2022 in U.S. Appl. No. 16/695,278, 19 pages.

(56) References Cited

OTHER PUBLICATIONS

Final Office Action dated Jul. 27, 2022 in U.S. Appl. No. 16/695,280, 17 pages.
Non-Final Office Action dated Jul. 29, 2022 in U.S. Appl. No. 16/695,281, 14 pages.

* cited by examiner

FUEL CELL STAGING FOR MOLTEN CARBONATE FUEL CELLS

CROSS-REFERENCE TO RELATED APPLICATIONS

This application claims priority to U.S. Patent Application No. 62/773,452, filed Nov. 30, 2018 and entitled "Fuel Cell Staging for Molten Carbonate Fuel Cells." The entirety of the aforementioned application is incorporated by reference herein.

FIELD

Methods are provided for using fuel cell staging when operating molten carbonate fuel cells under conditions for elevated $CO_2$ utilization.

BACKGROUND

This application discloses and claims subject matter made as a result of activities within the scope of a joint research agreement between ExxonMobil Research and Engineering Company and FuelCell Energy, Inc. that was in effect on or before the effective filing date of the present application.

Molten carbonate fuel cells utilize hydrogen and/or other fuels to generate electricity. The hydrogen may be provided by reforming methane or other reformable fuels in a steam reformer, such as a steam reformer located upstream of the fuel cell or integrated within the fuel cell. Fuel can also be reformed in the anode cell in a molten carbonate fuel cell, which can be operated to create conditions that are suitable for reforming fuels in the anode. Still another option can be to perform some reforming both externally and internally to the fuel cell. Reformable fuels can encompass hydrocarbonaceous materials that can be reacted with steam and/or oxygen at elevated temperature and/or pressure to produce a gaseous product that comprises hydrogen.

The basic structure of a molten carbonate fuel cell includes a cathode, an anode, and a matrix between the cathode and anode that includes one or more molten carbonate salts that serve as the electrolyte. During conventional operation of a molten carbonate fuel cell, the molten carbonate salts partially diffuse into the pores of the cathode. This diffusion of the molten carbonate salts into the pores of the cathode provides an interface region where $CO_2$ can be converted into $CO_3^{2-}$ for transport across the electrolyte to the anode.

Conventionally, cathodes for molten carbonate fuel cells are typically constructed to have a single layer. The properties of a single layer cathode are selected based on several types of properties. First, the cathode needs to have enough structural stability to maintain the integrity of the cathode layer while also providing sufficient conductivity to allow fuel cell operation. This typically results in a use of a material such as nickel for the electrode, which is oxidized and (optionally) lithiated during initial operation of the fuel cell. With regard to other properties, it is desirable to have a pore size that is small enough to provide sufficient wetting of the cathode by the electrolyte, again to provide suitable conductivity.

One difficulty with conventional electrode materials, such as (optionally lithiated) nickel oxide, is that nickel oxide is susceptible to polarization under fuel cell operating conditions. Polarization of the cathode results in additional voltage loss across the cathode during fuel cell operation. The impact of polarization can be mitigated by increasing the operating temperature of the fuel cell, but this can lead to reduced operating lifetime. Thus it would be desirable to have a molten carbonate cathode structure that can reduce polarization, as this can provide reduced voltage loss and/or can allow for a reduced operating temperature.

U.S. Pat. No. 9,077,007 describes methods for operating molten carbonate fuel cells for integrated power generation and chemical production. The methods include operating the fuel cells at reduced levels of fuel utilization. Configurations including fuel cells operating in parallel or passing anode flows and cathode flows through a series of fuel cells are also described.

SUMMARY

In an aspect, a method for producing electricity is provided. The method includes introducing an anode input stream comprising $H_2$, a reformable fuel, or a combination thereof into a first anode stage of a plurality of molten carbonate fuel cell stages. The method further includes introducing a cathode input stream comprising $O_2$ and $CO_2$ into a first cathode stage of the plurality of molten carbonate fuel cell stages. The method further includes passing a second anode input stream into a second anode stage of the plurality of molten carbonate fuel cell stages. The method further includes passing an intermediate cathode output into a second cathode stage of the plurality of molten carbonate fuel cell stages. The method further includes operating the plurality of molten carbonate fuel cell stages to generate i) electricity at an average current density of 60 $mA/cm^2$ or more, ii) an anode exhaust from the plurality of molten carbonate fuel cell stages comprising $H_2$, CO, and $CO_2$, and iii) a cathode exhaust from the plurality of molten carbonate fuel cell stages comprising a $CO_2$ content of 2.0 vol % or less, a $H_2O$ content of 1.0 vol % or more, and an $O_2$ content of 1.0 vol % or more, at least one of the first cathode stage and the second cathode stage being operated at a transference of 0.97 or less.

DETAILED DESCRIPTION OF THE EMBODIMENTS

Overview

Figure 1:
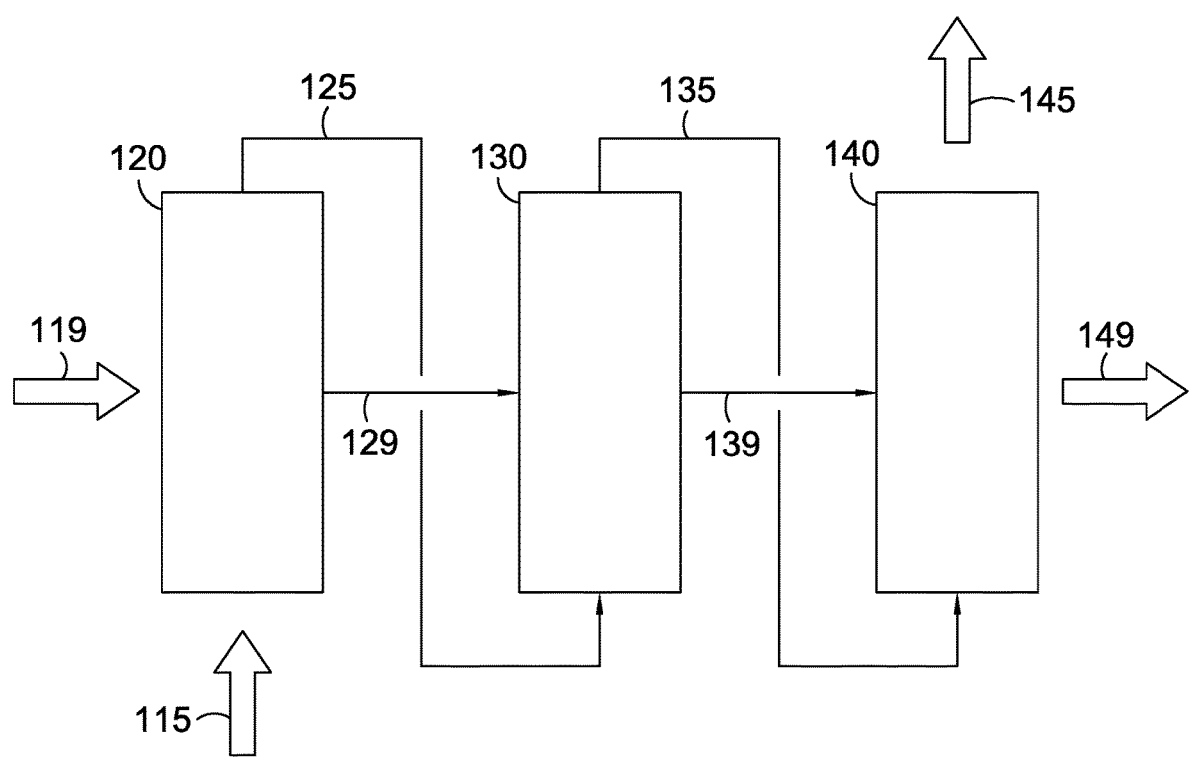
FIG. 1 shows an example of fuel cell staging in a co-current cross-flow configuration.

In various aspects, systems and methods are provided for using fuel cell staging to reduce or minimize variations in current density when operating molten carbonate fuel cells with elevated $CO_2$ utilization. In some aspects, operating a fuel cell or series of fuel cell stages with elevated $CO_2$ utilization corresponds to operating at least one fuel cell stage with a transference of 0.97 or less, or 0.95 or less, or 0.90 or less. Additionally or alternately, during operation with elevated $CO_2$ utilization, the $CO_2$ content of the output stream from the final cathode stage can include 2.0 vol % or less $CO_2$, or 1.0 vol % or less, or 0.8 vol % or less.

When operating a molten carbonate fuel cell stack as a single stage for elevated $CO_2$ utilization, it has been discovered that substantial alternative ion transport can occur. Alternative ion transport refers to transport of ions other than carbonate ions ($CO_3^{2-}$) across the molten carbonate electrolyte.

Conventional operating conditions for molten carbonate fuel cells typically correspond to conditions where the amount of alternative ion transport is reduced, minimized, or non-existent. The amount of alternative ion transport can be quantified based on the transference for a fuel cell. The transference is defined as the fraction of ions transported across the molten carbonate electrolyte that corresponds to carbonate ions, as opposed to hydroxide ions and/or other ions. A convenient way to determine the transference can be based on comparing a) the measured change in $CO_2$ concentration at the cathode inlet versus the cathode outlet with b) the amount of carbonate ion transport required to achieve the current density being produced by the fuel cell. It is noted that this definition for the transference assumes that back-transport of $CO_2$ from the anode to the cathode is minimal. It is believed that such back-transport is minimal for the operating conditions described herein. For the $CO_2$ concentrations, the cathode input stream and/or cathode output stream can be sampled, with the sample diverted to a gas chromatograph for determination of the $CO_2$ content. The average current density for the fuel cell can be measured in any convenient manner.

Under conventional operating conditions, the transference can be relatively close to 1.0, such as 0.98 or more and/or such as having substantially no alternative ion transport. A transference of 0.98 or more means that 98% or more of the ionic charge transported across the electrolyte corresponds to carbonate ions. It is noted that hydroxide ions have a charge of −1 while carbonate ions have a charge of −2, so two hydroxide ions need to be transported across the electrolyte to result in the same charge transfer as transport of one carbonate ion.

In contrast to conventional operating conditions, operating a molten carbonate fuel cell with transference of 0.95 or less (or 0.97 in at least one stage of a multi-stage configuration) can increase the effective amount of carbonate ion transport that is achieved, even though a portion of the current density generated by the fuel cell is due to transport of ions other than carbonate ions. In order to operate a fuel cell with a transference of 0.97 or less, or 0.95 or less, depletion of $CO_2$ has to occur within the fuel cell cathode. It has been discovered that such depletion of $CO_2$ within the cathode tends to be localized. As a result, many regions within a fuel cell cathode can still have sufficient $CO_2$ for normal operation. These regions contain additional $CO_2$ that would be desirable to transport across an electrolyte, such as for carbon capture. However, the $CO_2$ in such regions is typically not transported across the electrolyte when operating under conventional conditions. By selecting operating conditions with a transference of 0.97 or less, or 0.95 or less, the regions with sufficient $CO_2$ can be used to transport additional $CO_2$ while the depleted regions can operate based on alternative ion transport. This can increase the practical limit for the amount of $CO_2$ captured from a cathode input stream.

One difficulty in using MCFCs for elevated $CO_2$ capture is that the operation of the fuel cell can potentially be kinetically limited if one or more of the reactants required for fuel cell operation is present in low quantities. For example, when using a cathode input stream with a $CO_2$ content of 4.0 vol % or less, achieving a $CO_2$ utilization of 75% or more corresponds to a cathode outlet concentration of 1.0 vol % or less. However, a cathode outlet concentration of 1.0 vol % or less does not necessarily mean that the $CO_2$ is evenly distributed throughout the cathode. Instead, the concentration will typically vary within the cathode due to a variety of factors, such as the flow patterns in the anode and the cathode. The variations in $CO_2$ concentration can result in portions of the cathode where $CO_2$ concentrations substantially below 1.0 vol % are present.

Conventionally, it would be expected that depletion of $CO_2$ within the cathode would lead to reduced voltage and reduced current density. However, it has been discovered that current density can be maintained as $CO_2$ is depleted due to ions other than $CO_3^{2-}$ being transported across the electrolyte. For example, a portion of the ions transported across the electrolyte can correspond to hydroxide ions ($OH^-$). The transport of alternative ions across the electrolyte can allow a fuel cell to maintain a target current density even though the amount of $CO_2$ transported across the electrolyte is insufficient.

One of the advantages of transport of alternative ions across the electrolyte is that the fuel cell can continue to operate, even though a sufficient number of $CO_2$ molecules are not kinetically available. This can allow additional $CO_2$ to be transferred from cathode to anode even though the amount of $CO_2$ present in the cathode would conventionally be considered insufficient for normal fuel cell operation. This can allow the fuel cell to operate with a measured $CO_2$ utilization closer to 100%, while the calculated $CO_2$ utilization (based on current density) can be at least 3% greater than the measured $CO_2$ utilization, or at least 5% greater, or at least 10% greater, or at least 20% greater. It is noted that alternative ion transport can allow a fuel cell to operate with a current density that would correspond to more than 100% calculated $CO_2$ utilization.

Although transport of alternative ions can allow a fuel cell to maintain a target current density, it has further been discovered that transport of alternative ions across the electrolyte can also reduce or minimize the lifetime of a molten carbonate fuel cell. Thus, mitigation of this loss in fuel cell lifetime is desirable. It has been unexpectedly discovered that using multiple fuel cell stages can allow for elevated $CO_2$ capture while reducing or minimizing the amount of alternative ion transport.

In some aspects, elevated $CO_2$ capture can be defined based on the amount of transference, such as a transference of 0.97 or less, or 0.95 or less, or 0.93 or less, or 0.91 or less. Maintaining an operating condition with transference of 0.97 or less, or 0.95 or less can typically also result in a $CO_2$ concentration in the cathode output stream of 2.0 vol % or less, or 1.5 vol % or less, or 1.0 vol % or less. At higher $CO_2$ concentrations in the cathode output stream, there is typically not sufficient local depletion of $CO_2$ to result in lower transference values.

The presence of elevated $CO_2$ capture can also be indicated by other factors, although such other factors are by themselves typically not a sufficient condition to indicate elevated $CO_2$ capture. For example, when using a lower $CO_2$ concentration cathode input stream, elevated $CO_2$ capture can in some aspects correspond to a $CO_2$ utilization of 70% or more, or 75% or more, or 80% or more, such as up to 95% or possibly still higher. Examples of lower concentration sources of $CO_2$ can correspond to $CO_2$ sources that result in cathode input streams containing 5.0 vol % or less of $CO_2$, or 4.0 vol % or less, such as down to 1.5 vol % or possibly lower. The exhaust from a natural gas turbine is an example of a $CO_2$-containing stream that often has a $CO_2$ content of 5.0 vol % or less of $CO_2$, or 4.0 vol % or less. Additionally or alternately, elevated $CO_2$ capture can correspond to operating conditions where the molten carbonate fuel cell is used to generate a substantial amount of current density, such as 60 $mA/cm^2$ or more, or 80 $mA/cm^2$ or more, or 100 $mA/cm^2$ or more, or 120 $mA/cm^2$ or more, or 150 $mA/cm^2$ or more, or 200 $mA/cm^2$ or more, such as up to 300 $mA/cm^2$ or possibly still higher. It is noted that alternative ion transport can also be indicated by a reduced operating voltage for a fuel cell, as the reaction pathway for alternative ion transport has a lower theoretical voltage than the reaction pathway that uses carbonate ions.

Conventionally, the $CO_2$ concentration in the cathode exhaust of a molten carbonate fuel cell is maintained at a relatively high value, such as 5 vol % $CO_2$ or more, or 10 vol % $CO_2$ or more, or possibly still higher. Additionally, molten carbonate fuel cells are typically operated at $CO_2$ utilization values of 70% or less. When either of these conditions are present, the dominant mechanism for transport of charge across the molten carbonate electrolyte is transport of carbonate ions. While it is possible that transport of alternative ions (such as hydroxide ions) across the electrolyte occurs under such conventional conditions, the amount of alternative ion transport is de minimis, corresponding to 2% or less of the current density (or equivalently, a transference of 0.98 or more).

As an alternative to describing operating conditions in terms of transference, the operating conditions can be described based on measured $CO_2$ utilization and "calculated" $CO_2$ utilization based on average current density. In this discussion, the measured $CO_2$ utilization corresponds to the amount of $CO_2$ that is removed from the cathode input stream. This can be determined, for example, by using gas chromatography to determine the $CO_2$ concentration in the cathode input stream and the cathode output stream. This can also be referred to as the actual $CO_2$ utilization, or simply as the $CO_2$ utilization. In this discussion, the calculated $CO_2$ utilization is defined as the $CO_2$ utilization that would occur if all of the current density generated by the fuel cell was generated based on transport of $CO_3^{2-}$ ions across the electrolyte (i.e., transport of ions based on $CO_2$). The difference in measured $CO_2$ utilization and the calculated $CO_2$ utilization can be used individually to characterize the amount of alternative ion transport, and/or these values can be used to calculate the transference, as described above.

It has been discovered that the amount of alternative ion transport that occurs when operating molten carbonate fuel cells with elevated $CO_2$ utilization can be reduced or minimized by performing the elevated $CO_2$ utilization using more than one fuel cell stage. Even though the same (or preferably) a smaller fuel cell area is used, operating a plurality of fuel cell stages to achieve elevated $CO_2$ utilization can reduce or minimize the amount of variation in $CO_2$ concentration in the cathode flow pattern. This can result in a corresponding reduction in the amount of alternative ion transport. For example, when operating the fuel cell stages with a cross-flow configuration of the anode and cathode gas flows, the amount of alternative ion transport in the fuel cell corner corresponding to the anode inlet and the cathode outlet can be reduced or minimized. This reduction in alternative ion transport can be beneficial, for example, for increasing the operating lifetime of the fuel cell(s).

When using multiple fuel cell stages in series, the anode flows and cathode flows through the cells can be arranged in various manners, such as having co-current flow or counter-current flow. In co-current flow, a fuel cell corresponding to a first stage for the anode flow is also the first stage for the cathode. In counter-current flow, a fuel cell corresponding to a first stage for the anode (or cathode) corresponds to a last stage and/or a stage different from the first stage for the cathode (or anode). Additionally, the flow within a single fuel cell can be characterized. For example, in a cross-flow configuration, the direction of flow in the anode for a given fuel cell can be oriented roughly perpendicular to the direction of flow in the anode. A cross-flow configuration is in contrast to an aligned flow configuration, where the direction of flow in the anode can be oriented along roughly the same flow axis as the direction of flow in the cathode. Depending on the aspect, various combinations of fuel cells (such as combinations of fuel cell stacks) can be arranged in series and/or in parallel. In such aspects, for the fuel cells arranged in series, any convenient combination of co-current flow, counter-current flow, cross-current flow, and/or aligned flow can be used.

FIG. 1 shows an example of a series of fuel cells (such as a series of fuel cell stacks) that are arranged in a co-current cross-flow configuration. In the example shown in FIG. 1, fuel cell 120, fuel cell 130, and fuel cell 140 are arranged to operate in series. Cathode input flow 119 and anode input flow 115 are both passed into fuel cell 120 as the first fuel cell stage. The first stage cathode intermediate output 129 and the first stage anode intermediate output 125 are then passed into second fuel cell 130. The second stage cathode intermediate output 139 and the second stage anode intermediate output 135 are then passed into third fuel cell stage 140. In the example shown in FIG. 1, third fuel cell 140 corresponds to the final stage, so that the outputs from third fuel cell 140 correspond to cathode output 149 and anode output 145. As shown in FIG. 1, in each of fuel cell 120, fuel cell 130, and fuel cell 140, the flow direction for the anode flow is roughly orthogonal to the flow direction for the cathode flow. Thus, the flows in fuel cell 120, fuel cell 130, and fuel cell 140 correspond to cross-flow orientation.

Figure 2:
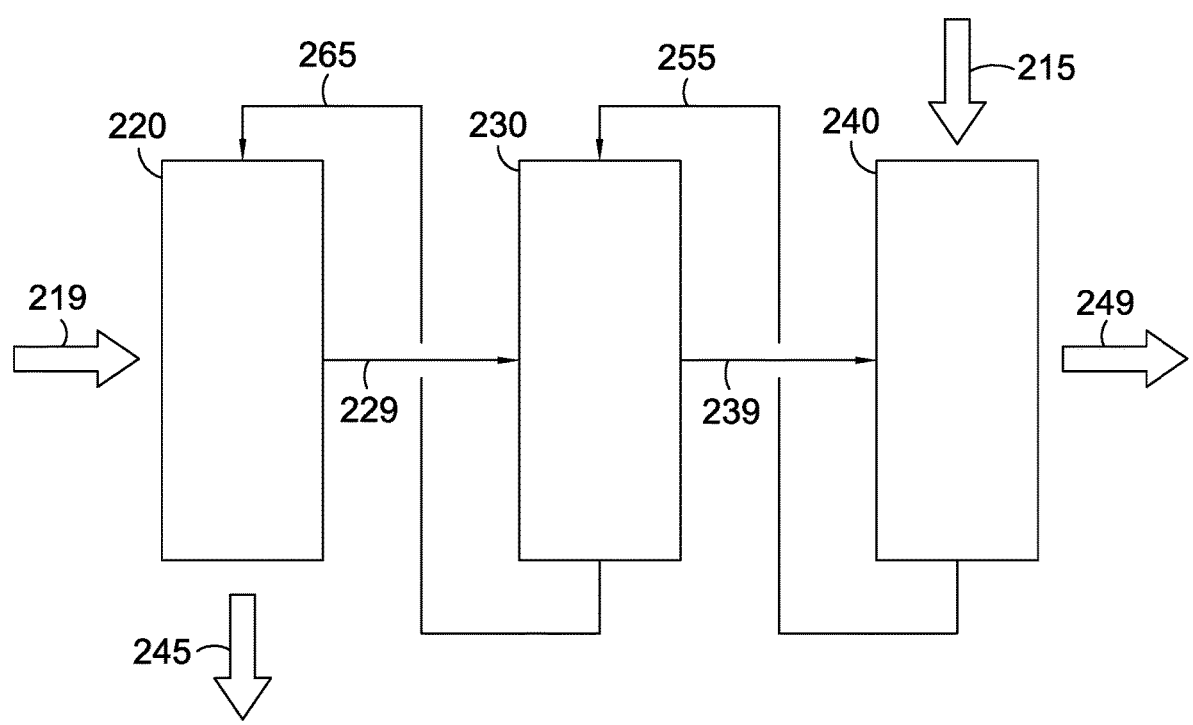
FIG. 2 shows an example of fuel cell staging in a counter-current cross-flow configuration.

FIG. 2 shows an example of a series of fuel cells (such as a series of fuel cell stacks) that are arranged in a counter-current cross-flow configuration. In the example shown in FIG. 2, fuel cell 220, fuel cell 230, and fuel cell 240 are arranged to operate in series. Cathode input flow 219 is passed into fuel cell 220 as the first cathode fuel cell stage. The first stage cathode intermediate output 229 is passed into fuel cell 230 as the second cathode fuel cell stage. The second stage cathode intermediate output 239 is passed into fuel cell 240 as the third cathode fuel cell stage. In the example shown in FIG. 2, fuel cell 240 corresponds to the final cathode fuel cell stage, so the output from the cathode of fuel cell 240 corresponds to cathode output 249. In contrast to FIG. 1, anode input 215 is passed into fuel cell 240 as the first anode fuel cell stage. This results in a first stage anode intermediate output 255 that is passed into fuel cell 230 as a second anode fuel cell stage. The second stage anode intermediate output 265 is passed into fuel cell 220, which corresponds to the third (final) fuel cell stage for the anode flow. The output from the anode of fuel cell 220 corresponds to the anode output 245. As shown in FIG. 2, in each of fuel cell 220, fuel cell 230, and fuel cell 240, the flow direction for the anode flow is roughly orthogonal to the flow direction for the cathode flow. Thus, the flows in fuel cell 220, fuel cell 230, and fuel cell 240 correspond to cross-flow orientation.

In some aspects, any convenient type of electrolyte suitable for operation of a molten carbonate fuel cell can be used. Many conventional MCFCs use a eutectic carbonate mixture as the carbonate electrolyte, such as a eutectic mixture of 62 mol % lithium carbonate and 38 mol % potassium carbonate (62% $Li_2CO_3$/38% $K_2CO_3$) or a eutectic mixture of 52 mol % lithium carbonate and 48 mol % sodium carbonate (52% $Li_2CO_3$/48% $Na_2CO_3$). Other eutectic mixtures are also available, such as a eutectic mixture of 40 mol % lithium carbonate and 60 mol % potassium carbonate (40% $Li_2CO_3$/60% $K_2CO_3$). While eutectic mixtures of carbonate can be convenient as an electrolyte for various reasons, non-eutectic mixtures of carbonates can also be suitable. Generally, such non-eutectic mixtures can include various combinations of lithium carbonate, sodium carbonate, and/or potassium carbonate. Optionally, lesser amounts of other metal carbonates can be included in the electrolyte as additives, such as other alkali carbonates (rubidium carbonate, cesium carbonate), or other types of metal carbonates such as barium carbonate, bismuth carbonate, lanthanum carbonate, or tantalum carbonate.

It is noted that the structure of a molten carbonate fuel cell can also have an impact on how quickly degradation occurs. For example, the open area of the cathode surface that is available for receiving cathode gas can impact how rapidly degradation occurs. In order to make electrical contact, at least a portion of the cathode collector is typically in contact with the cathode surface in a molten carbonate fuel cell. The open area of a cathode surface (adjacent to the cathode current collector) is defined as the percentage of the cathode surface that is not in contact with the cathode current collector. For conventional molten carbonate fuel cell designs, a typical value for the open area is roughly 33%. This is due to the nature of conventional cathode collector configurations, which correspond to a plate-like structure that rests on the cathode surface, with a portion of the plate-like structure having openings that allow for diffusion of cathode gas into the cathode. In various aspects, additional benefit can be achieved by using a cathode current collector that provides a larger open area at the cathode surface, such as an open area of 45% or more, or 50% or more, or 60% or more, such as up to 90% or possibly still higher.

Conditions for Molten Carbonate Fuel Cell Operation with Alternative Ion Transport In various aspects, the operating conditions for a molten carbonate fuel cell (such as a cell as part of a fuel cell stack) can be selected to correspond to a transference of 0.97 or less, or 0.95 or less, thereby causing the cell to transport both carbonate ion and at least one type of alternative ion across the electrolyte. In addition to transference, operating conditions that can indicate that a molten carbonate fuel cell is operating with transport of alternative ions include, but are not limited to, $CO_2$ concentration for the cathode input stream, the $CO_2$ utilization in the cathode, the current density for the fuel cell, the voltage drop across the cathode, the voltage drop across the anode, and the $O_2$ concentration in the cathode input stream. Additionally, the anode input stream and fuel utilization in the anode can be generally selected to provide the desired current density.

Generally, to cause alternative ion transport, the $CO_2$ concentration in at least a portion of the cathode needs to be sufficiently low while operating the fuel cell to provide a sufficiently high current density. Having a sufficiently low $CO_2$ concentration in the cathode typically corresponds to some combination of a low $CO_2$ concentration in the cathode input flow, a high $CO_2$ utilization, and/or a high average current density. However, such conditions alone are not sufficient to indicate a transference of 0.97 or less, or 0.95 or less.

For example, a molten carbonate fuel cell with a cathode open area of roughly 33% was operated with a $CO_2$ cathode inlet concentration of 19 vol %, 75% $CO_2$ utilization, and 160 mA/cm$^2$ of average current density. These conditions corresponded to a difference between calculated $CO_2$ utilization and measured $CO_2$ utilization of less than 1%. Thus, the presence of substantial alternative ion transport/a transference of 0.97 or less, or 0.95 or less, cannot be inferred simply from the presence of a high $CO_2$ utilization and a high average current density.

As another example, a molten carbonate fuel cell with a cathode open area of between 50% and 60% was operated with a $CO_2$ cathode inlet concentration of 4.0 vol %, 89% $CO_2$ utilization, and 100 mA/cm$^2$ of current density. These conditions corresponded to a transference of at least 0.97. Thus, the presence of a transference of 0.95 or less/substantial alternative ion transport cannot be inferred simply from the presence of high $CO_2$ utilization in combination with low $CO_2$ concentration in the cathode input stream.

As still another example, a molten carbonate fuel cell with a cathode open area of between 50% and 60% was operated with a $CO_2$ cathode inlet concentration of 13 vol %, 68% $CO_2$ utilization, and 100 mA/cm$^2$ of current density. These conditions corresponded to a transference of at least 0.98.

In this discussion, operating an MCFC to transport alternative ions across the electrolyte is defined as operating the MCFC so that more than a de minimis amount of alternative ions are transported. It is possible that minor amounts of alternative ions are transported across an MCFC electrolyte under a variety of conventional conditions. Such alternative ion transport under conventional conditions can correspond to a transference of 0.98 or more, which corresponds to transport of alternative ions corresponding to less than 2.0% of the current density for the fuel cell. By contrast, in this discussion, operating an MCFC to cause alternative ion transport is defined as operating an MCFC with a transference of 0.95 or less, so that 5.0% or more of the current density (or, 5.0% or more of the calculated $CO_2$ utilization) corresponds to current density based on transport of alternative ions, or 10% or more, or 20% or more, such as up to 35% or possibly still higher. It is noted that in some aspects, operating with multiple fuel cell stages can reduce the severity of the conditions that would otherwise be needed in any single fuel cell stage to achieve elevated $CO_2$ capture. Thus, by operating with multiple stages, some operating conditions with elevated $CO_2$ capture may correspond to a transference of 0.97 or less.

In this discussion, operating an MCFC to cause substantial alternative ion transport (i.e., to operate with a transference of 0.95 or less, or 0.97 or less within one or more stages of a multi-stage configuration) is further defined to correspond to operating an MCFC with voltage drops across the anode and cathode that are suitable for power generation. The total electrochemical potential difference for the reactions in a molten carbonate fuel cell is ~1.04 V. Due to practical considerations, an MCFC is typically operated to generate current at a voltage near 0.7 V or about 0.8 V. This corresponds to a combined voltage drop across the cathode, electrolyte, and anode of roughly 0.34 V. In order to maintain stable operation, the combined voltage drop across the cathode, electrolyte, and anode can be less than ~0.5 V, so that the resulting current generated by the fuel cell is at a voltage of 0.55 V or more, or 0.6 V or more.

With regard to the anode, one condition for operating with substantial alternative ion transport can be to have an $H_2$ concentration of 8.0 vol % or more, or 10 vol % or more in the region where the substantial alternative ion transport occurs. Depending on the aspect, this could correspond to a region near the anode inlet, a region near the cathode outlet, or a combination thereof. Generally, if the $H_2$ concentration in a region of the anode is too low, there will be insufficient driving force to generate substantial alternative ion transport.

Suitable conditions for the anode can also include providing the anode with $H_2$, a reformable fuel, or a combination thereof; and operating with any convenient fuel utilization that generates a desired current density, including fuel utilizations ranging from 20% to 80%. In some aspects this can correspond to a traditional fuel utilization amount, such as a fuel utilization of 60% or more, or 70% or more, such as up to 85% or possibly still higher. In other aspects, this can correspond to a fuel utilization selected to provide an anode output stream with an elevated content of $H_2$ and/or an elevated combined content of $H_2$ and CO (i.e., syngas), such as a fuel utilization of 55% or less, or 50% or less, or 40% or less, such as down to 20% or possibly still lower. The $H_2$ content in the anode output stream and/or the combined content of $H_2$ and CO in the anode output stream can be sufficient to allow generation of a desired current density. In some aspects, the $H_2$ content in the anode output stream can be 3.0 vol % or more, or 5.0 vol % or more, or 8.0 vol % or more, such as up to 15 vol % or possibly still higher. Additionally or alternately, the combined amount of $H_2$ and CO in the anode output stream can be 4.0 vol % or more, or 6.0 vol % or more, or 10 vol % or more, such as up to 20 vol % or possibly still higher. Optionally, when the fuel cell is operated with low fuel utilization, the $H_2$ content in the anode output stream can be in a higher range, such as an $H_2$ content of 10 vol % to 25 vol %. In such aspects, the syngas content of the anode output stream can be correspondingly higher, such as a combined $H_2$ and CO content of 15 vol % to 35 vol %. Depending on the aspect, the anode can be operated to increase the amount of electrical energy generated, to increase the amount of chemical energy generated (i.e., $H_2$ generated by reforming that is available in the anode output stream), or operated using any other convenient strategy that is compatible with operating the fuel cell to cause alternative ion transport.

In addition to having sufficient $H_2$ concentration in the anode, one or more locations within the cathode need to have a low enough $CO_2$ concentration so that the more favorable pathway of carbonate ion transport is not readily available. In some aspects, this can correspond to having a $CO_2$ concentration in the cathode outlet stream (i.e., cathode exhaust) of 2.0 vol % or less, or 1.0 vol % or less, or 0.8 vol % or less. It is noted that due to variations within the cathode, an average concentration of 2.0 vol % or less (or 1.0 vol % or less, or 0.8 vol % or less) in the cathode exhaust can correspond to a still lower $CO_2$ concentration in localized regions of the cathode. For example, in a cross-flow configuration, at a corner of the fuel cell that is adjacent to the anode inlet and the cathode outlet, the $CO_2$ concentration can be lower than a corner of the same fuel cell that is adjacent to the anode outlet and the cathode outlet. Similar localized variations in $CO_2$ concentration can also occur in fuel cells having a co-current or counter-current configuration.

In addition to having a low concentration of $CO_2$, the localized region of the cathode can also have 1.0 vol % or more of $O_2$, or 2.0 vol % or more. In the fuel cell, $O_2$ is used to form the hydroxide ion that allows for alternative ion transport. If sufficient $O_2$ is not present, the fuel cell will not operate as both the carbonate ion transport and alternative ion transport mechanisms are dependent on $O_2$ availability. With regard to $O_2$ in the cathode input stream, in some aspects this can correspond to an oxygen content of 4.0 vol % to 15 vol %, or 6.0 vol % to 10 vol %.

It has been observed that a sufficient amount of water should also be present for alternative ion transport to occur, such as 1.0 vol % or more, or 2.0 vol % or more. Without being bound by any particular theory, if water is not available in the cathode when attempting to operate with substantial alternative ion transport, the fuel cell appears to degrade at a much more rapid rate than the deactivation rate that is observed due to alternative ion transport with sufficient water available. It is noted that because air is commonly used as an $O_2$ source, and since $H_2O$ is one of the products generated during combustion, a sufficient amount of water is typically available within the cathode.

Due to the non-uniform distribution of cathode gas and/or anode gas during operation of a molten carbonate fuel cell for elevated $CO_2$ capture, it is believed that one or more of the corners and/or edges of the molten carbonate fuel cell will typically have a substantially higher density of alternative ion transport. The one or more corners can correspond to locations where the $CO_2$ concentration in the cathode is lower than average, or a location where the $H_2$ concentration in the anode is greater than average, or a combination thereof.

In this discussion, a fuel cell can correspond to a single cell, with an anode and a cathode separated by an electrolyte. The anode and cathode can receive input gas flows to facilitate the respective anode and cathode reactions for transporting charge across the electrolyte and generating electricity. A fuel cell stack can represent a plurality of cells in an integrated unit. Although a fuel cell stack can include multiple fuel cells, the fuel cells can typically be connected in parallel and can function (approximately) as if they collectively represented a single fuel cell of a larger size. When an input flow is delivered to the anode or cathode of a fuel cell stack, the fuel cell stack can include flow channels for dividing the input flow between each of the cells in the stack and flow channels for combining the output flows from the individual cells. In this discussion, a fuel cell array can be used to refer to a plurality of fuel cells (such as a plurality of fuel cell stacks) that are arranged in series, in parallel, or in any other convenient manner (e.g., in a combination of series and parallel). A fuel cell array can include one or more stages of fuel cells and/or fuel cell stacks, where the anode/cathode output from a first stage may serve as the anode/cathode input for a second stage. It is noted that the anodes in a fuel cell array do not have to be connected in the same way as the cathodes in the array. For convenience, the input to the first anode stage of a fuel cell array may be referred to as the anode input for the array, and the input to the first cathode stage of the fuel cell array may be referred to as the cathode input to the array. Similarly, the output from the final anode/cathode stage may be referred to as the anode/cathode output from the array. In aspects where a fuel cell stack includes separate reforming elements, it is noted that the anode input flow may first pass through a reforming element prior to entering one or more anodes associated with the reforming element.

It should be understood that reference to use of a fuel cell herein typically denotes a "fuel cell stack" composed of individual fuel cells, and more generally refers to the use of one or more fuel cell stacks in fluid communication. Individual fuel cell elements (plates) can typically be "stacked" together in a rectangular array called a "fuel cell stack." Additional types of elements can also be included in the fuel cell stack, such as reforming elements. This fuel cell stack can typically take a feed stream and distribute reactants among all of the individual fuel cell elements and can then collect the products from each of these elements. When viewed as a unit, the fuel cell stack in operation can be taken as a whole even though composed of many (often tens or hundreds) of individual fuel cell elements. These individual fuel cell elements can typically have similar voltages (as the reactant and product concentrations are similar), and the total power output can result from the summation of all of the electrical currents in all of the cell elements, when the elements are electrically connected in series. Stacks can also be arranged in a series arrangement to produce high voltages. A parallel arrangement can boost the current. If a sufficiently large volume fuel cell stack is available to process a given exhaust flow, the systems and methods described herein can be used with a single molten carbonate fuel cell stack. In other aspects of the invention, a plurality of fuel cell stacks may be desirable or needed for a variety of reasons.

For the purposes of this invention, unless otherwise specified, the term "fuel cell" should be understood to also refer to and/or is defined as including a reference to a fuel cell stack composed of a set of one or more individual fuel cell elements for which there is a single input and output, as that is the manner in which fuel cells are typically employed in practice. Similarly, the term fuel cells (plural), unless otherwise specified, should be understood to also refer to and/or is defined as including a plurality of separate fuel cell stacks. In other words, all references within this document, unless specifically noted, can refer interchangeably to the operation of a fuel cell stack as a "fuel cell." For example, the volume of exhaust generated by a commercial scale combustion generator may be too large for processing by a fuel cell (i.e., a single stack) of conventional size. In order to process the full exhaust, a plurality of fuel cells (i.e., two or more separate fuel cells or fuel cell stacks) can be arranged in parallel, so that each fuel cell can process (roughly) an equal portion of the combustion exhaust. Although multiple fuel cells can be used, each fuel cell can typically be operated in a generally similar manner, given its (roughly) equal portion of the combustion exhaust.

Figure 3:
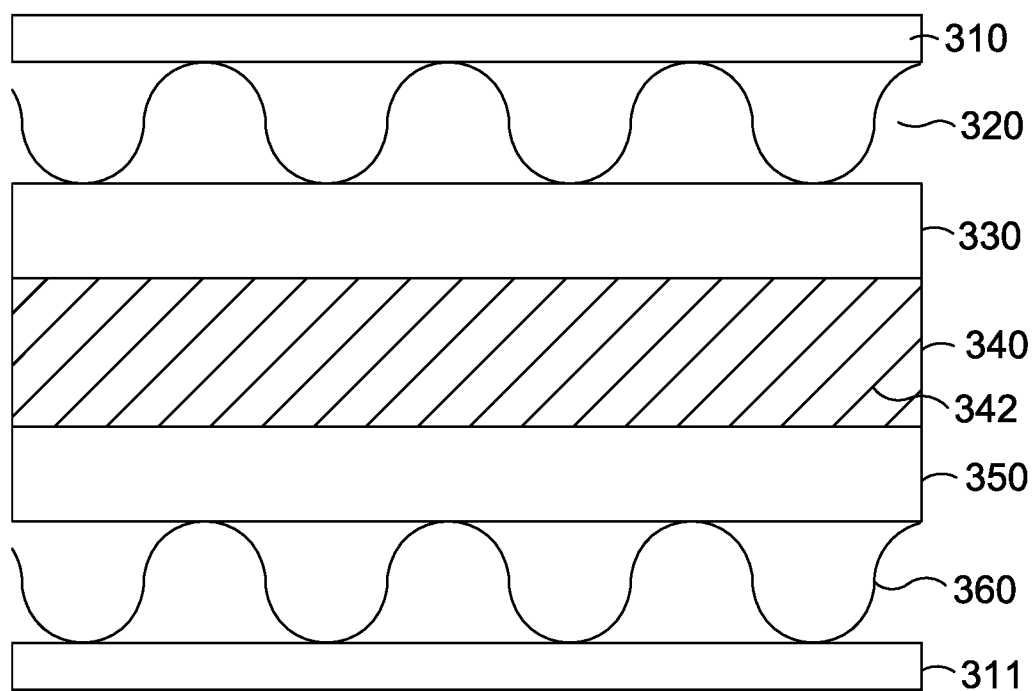
FIG. 3 shows an example of a portion of a molten carbonate fuel cell stack.

Example of Molten Carbonate Fuel Cell Operation: Cross Flow Orientation for Cathode and Anode FIG. 3 shows a general example of a portion of a molten carbonate fuel cell stack. The portion of the stack shown in FIG. 3 corresponds to a fuel cell 301. In order to isolate the fuel cell from adjacent fuel cells in the stack and/or other elements in the stack, the fuel cell includes separator plates 310 and 311. In FIG. 3, the fuel cell 301 includes an anode 330 and a cathode 350 that are separated by an electrolyte matrix 340 that contains an electrolyte 342. In various aspects, cathode 350 can correspond to a dual-layer (or multi-layer) cathode. Anode collector 320 provides electrical contact between anode 330 and the other anodes in the fuel cell stack, while cathode collector 360 provides similar electrical contact between cathode 350 and the other cathodes in the fuel cell stack. Additionally anode collector 320 allows for introduction and exhaust of gases from anode 330, while cathode collector 360 allows for introduction and exhaust of gases from cathode 350.

During operation, $CO_2$ is passed into the cathode collector 360 along with $O_2$. The $CO_2$ and $O_2$ diffuse into the porous cathode 350 and travel to a cathode interface region near the boundary of cathode 350 and electrolyte matrix 340. In the cathode interface region, a portion of electrolyte 342 can be present in the pores of cathode 350. The $CO_2$ and $O_2$ can be converted near/in the cathode interface region to a carbonate ion ($CO_3^{2-}$), which can then be transported across electrolyte 342 (and therefore across electrolyte matrix 340) to facilitate generation of electrical current. In aspects where alternative ion transport is occurring, a portion of the $O_2$ can be converted to an alternative ion, such as a hydroxide ion or a peroxide ion, for transport in electrolyte 342. After transport across the electrolyte 342, the carbonate ion (or alternative ion) can reach an anode interface region near the boundary of electrolyte matrix 340 and anode 330. The carbonate ion can be converted back to $CO_2$ and $H_2O$ in the presence of $H_2$, releasing electrons that are used to form the current generated by the fuel cell. The $H_2$ and/or a hydrocarbon suitable for forming $H_2$ are introduced into anode 330 via anode collector 320.

The flow direction within the anode of a molten carbonate fuel cell can have any convenient orientation relative to the flow direction within a cathode. One option can be to use a cross-flow configuration, so that the flow direction within the anode is roughly at a 90° angle relative to the flow direction within the cathode. This type of flow configuration can have practical benefits, as using a cross-flow configuration can allow the manifolds and/or piping for the anode inlets/outlets to be located on different sides of a fuel cell stack from the manifolds and/or piping for the cathode inlets/outlets.

Figure 4:
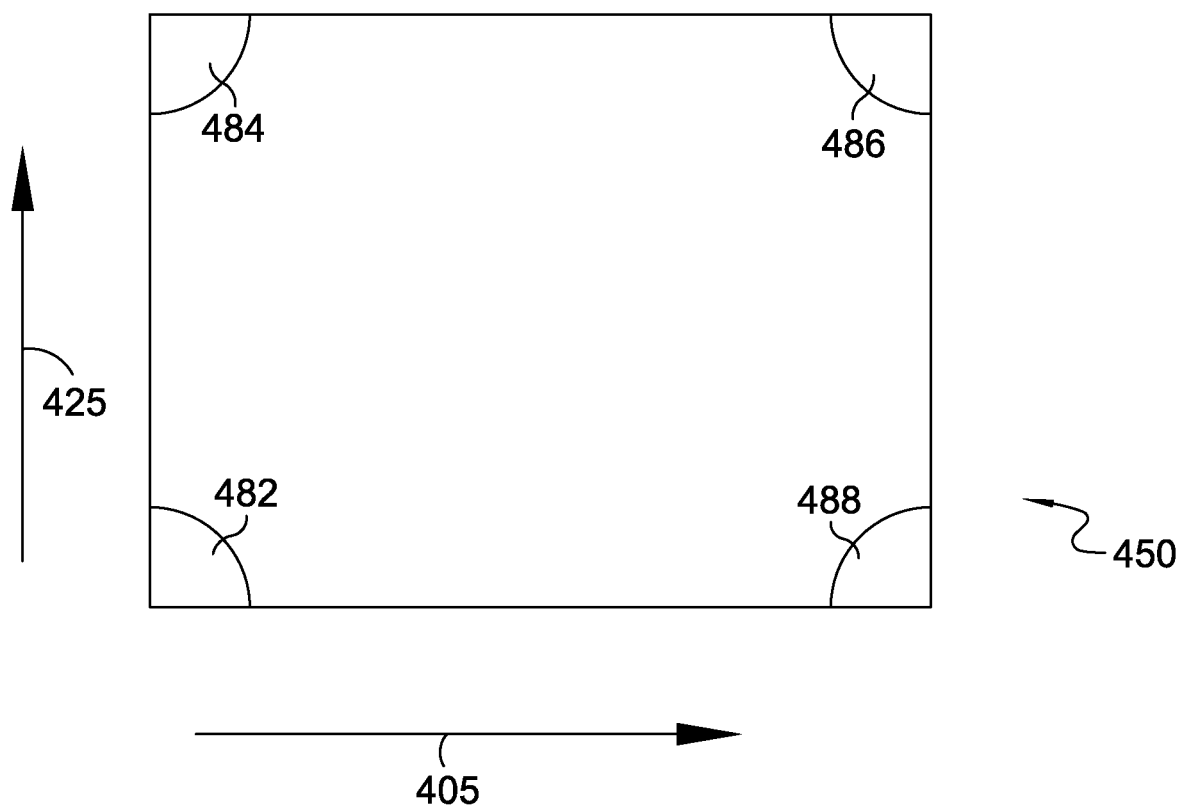
FIG. 4 shows a flow pattern example for a molten carbonate fuel cell with an anode flow direction that is aligned roughly perpendicular to a cathode flow direction.

FIG. 4 schematically shows an example of a top view for a fuel cell cathode, along with arrows indicating the direction of flow within the fuel cell cathode and the corresponding fuel cell anode. In FIG. 4, arrow 405 indicates the direction of flow within cathode 450, while arrow 425 indicates the direction of flow within the anode (not shown).

Because the anode and cathode flows are oriented at roughly 90° relative to each other, the anode and cathode flow patterns can contribute to having different reaction conditions in various parts of the cathode. The different conditions can be illustrated by considering the reaction conditions in the four corners of the cathode. In the illustration in FIG. 4, the reaction conditions described herein are qualitatively similar to the reaction conditions for a fuel cell operating with a $CO_2$ utilization of 70% or more (or 80% or more).

Corner 482 corresponds to a portion of the fuel cell that is close to the entry point for both the cathode input flow and the anode input flow. As a result, the concentration of both $CO_2$ (in the cathode) and $H_2$ (in the anode) is relatively high in corner 482. Based on the high concentrations, it is expected that portions of the fuel cell near corner 482 can operate under expected conditions, with substantially no transport of ions other than carbonate ions across the electrolyte.

Corner 484 corresponds to a portion of the fuel cell that is close to the entry point for the cathode input flow and close to the exit point for the anode output flow. In locations near corner 484, the amount of current density may be limited due to the reduced concentration of $H_2$ in the anode, depending on the fuel utilization. However, sufficient $CO_2$ should be present so that any ions transported across the electrolyte substantially correspond to carbonate ions.

Corner 486 corresponds to a portion of the fuel cell that is close to the exit point for the anode output flow and close to the exit point for the cathode output flow. In locations near corner 486, due to the lower concentrations of both $H_2$ (in the anode) and $CO_2$ (in the cathode), little or no current would be expected due to the low driving force for the fuel cell reaction.

Corner 488 corresponds to a portion of the fuel cell that is close to the entry point for the anode input flow and close to the exit point for the cathode output flow. The relatively high availability of hydrogen at locations near corner 488 would be expected to result in substantial current density. However, due to the relatively low concentration of $CO_2$, a substantial amount of transport of hydroxide ions and/or other alternative ions can occur. Depending on the aspect, the substantial amount of alternative ion transport can increase the calculated $CO_2$ utilization by 5% or more, or 10% or more, or 15% or more, or 20% or more. Additionally or alternately, the transference can be 0.95 or less, or 0.90 or less, or 0.85 or less, or 0.80 or less. The transport of substantial amounts of alternative ions across the electrolyte can temporarily allow higher current densities to be maintained at locations near corner 488. However, the transport of alternative ions can also degrade the cathode and/or anode structures, resulting in lower (and possibly no) current density over time at locations near corner 488. It is noted that at lower amounts of alternative ion transport (such as a transference of 0.96 or more, or 0.98 or more), the amount of lifetime degradation is not as severe.

It has been discovered that when alternative ion transport becomes significant at one or more locations within the fuel cell, the fuel cell will quickly begin to degrade. This is believed to be due to the one or more locations degrading and not providing any further current density. As region(s) stop contributing to the desired current density, the remaining locations in the fuel cell have to operate at higher current densities in order to maintain a constant overall (average) current density for the fuel cell. This can cause the region for transport of alternative ions to grow, resulting in an expanding portion of the fuel cell that degrades and eventually stops working. Alternatively, degradation of a portion of the fuel cell can result in reduced total current density from the cell, which is also undesirable. Operating multiple fuel stages can reduce the amount of alternative ion transport that occurs within a fuel cell stage during elevated $CO_2$ capture, allowing for longer fuel cell lifetimes.

Anode Inputs and Outputs

In various aspects, the anode input stream for an MCFC can include hydrogen, a hydrocarbon such as methane, a hydrocarbonaceous or hydrocarbon-like compound that may contain heteroatoms different from C and H, or a combination thereof. The source of the hydrogen/hydrocarbon/hydrocarbon-like compounds can be referred to as a fuel source. In some aspects, most of the methane (or other hydrocarbon, hydrocarbonaceous, or hydrocarbon-like compound) fed to the anode can typically be fresh methane. In this description, a fresh fuel such as fresh methane refers to a fuel that is not recycled from another fuel cell process. For example, methane recycled from the anode outlet stream back to the anode inlet may not be considered "fresh" methane, and can instead be described as reclaimed methane.

The fuel source used can be shared with other components, such as a turbine that uses a portion of the fuel source to provide a $CO_2$-containing stream for the cathode input. The fuel source input can include water in a proportion to the fuel appropriate for reforming the hydrocarbon (or hydrocarbon-like) compound in the reforming section that generates hydrogen. For example, if methane is the fuel input for reforming to generate $H_2$, the molar ratio of water to fuel can be from about one to one to about ten to one, such as at least about two to one. A ratio of four to one or greater is typical for external reforming, but lower values can be typical for internal reforming. To the degree that $H_2$ is a portion of the fuel source, in some optional aspects no additional water may be needed in the fuel, as the oxidation of $H_2$ at the anode can tend to produce $H_2O$ that can be used for reforming the fuel. The fuel source can also optionally contain components incidental to the fuel source (e.g., a natural gas feed can contain some content of $CO_2$ as an additional component). For example, a natural gas feed can contain $CO_2$, $N_2$, and/or other inert (noble) gases as additional components. Optionally, in some aspects the fuel source may also contain CO, such as CO from a recycled portion of the anode exhaust. An additional or alternate potential source for CO in the fuel into a fuel cell assembly can be CO generated by steam reforming of a hydrocarbon fuel performed on the fuel prior to entering the fuel cell assembly.

More generally, a variety of types of fuel streams may be suitable for use as an anode input stream for the anode of a molten carbonate fuel cell. Some fuel streams can correspond to streams containing hydrocarbons and/or hydrocarbon-like compounds that may also include heteroatoms different from C and H. In this discussion, unless otherwise specified, a reference to a fuel stream containing hydrocarbons for an MCFC anode is defined to include fuel streams containing such hydrocarbon-like compounds. Examples of hydrocarbon (including hydrocarbon-like) fuel streams include natural gas, streams containing C1-C4 carbon compounds (such as methane or ethane), and streams containing heavier C5+ hydrocarbons (including hydrocarbon-like compounds), as well as combinations thereof. Still other additional or alternate examples of potential fuel streams for use in an anode input can include biogas-type streams, such as methane produced from natural (biological) decomposition of organic material.

In some aspects, a molten carbonate fuel cell can be used to process an input fuel stream, such as a natural gas and/or hydrocarbon stream, with a low energy content due to the presence of diluent compounds. For example, some sources of methane and/or natural gas are sources that can include substantial amounts of either $CO_2$ or other inert molecules, such as nitrogen, argon, or helium. Due to the presence of elevated amounts of $CO_2$ and/or inerts, the energy content of a fuel stream based on the source can be reduced. Using a low energy content fuel for a combustion reaction (such as for powering a combustion-powered turbine) can pose difficulties. However, a molten carbonate fuel cell can generate power based on a low energy content fuel source with a reduced or minimal impact on the efficiency of the fuel cell. The presence of additional gas volume can require additional heat for raising the temperature of the fuel to the temperature for reforming and/or the anode reaction. Additionally, due to the equilibrium nature of the water gas shift reaction within a fuel cell anode, the presence of additional $CO_2$ can have an impact on the relative amounts of $H_2$ and CO present in the anode output. However, the inert compounds otherwise can have only a minimal direct impact on the reforming and anode reactions. The amount of $CO_2$ and/or inert compounds in a fuel stream for a molten carbonate fuel cell, when present, can be at least about 1 vol %, such as at least about 2 vol %, or at least about 5 vol %, or at least about 10 vol %, or at least about 15 vol %, or at least about 20 vol %, or at least about 25 vol %, or at least about 30 vol %, or at least about 35 vol %, or at least about 40 vol %, or at least about 45 vol %, or at least about 50 vol %, or at least about 75 vol %. Additionally or alternatively, the amount of $CO_2$ and/or inert compounds in a fuel stream for a molten carbonate fuel cell can be about 90 vol % or less, such as about 75 vol % or less, or about 60 vol % or less, or about 50 vol % or less, or about 40 vol % or less, or about 35 vol % or less.

Yet other examples of potential sources for an anode input stream can correspond to refinery and/or other industrial process output streams. For example, coking is a common process in many refineries for converting heavier compounds to lower boiling ranges. Coking typically produces an off-gas containing a variety of compounds that are gases at room temperature, including CO and various $C_1$-$C_4$ hydrocarbons. This off-gas can be used as at least a portion of an anode input stream. Other refinery off-gas streams can additionally or alternatively be suitable for inclusion in an anode input stream, such as light ends ($C_1$-$C_4$) generated during cracking or other refinery processes. Still other suitable refinery streams can additionally or alternatively include refinery streams containing CO or $CO_2$ that also contain $H_2$ and/or reformable fuel compounds.

Still other potential sources for an anode input can additionally or alternately include streams with increased water content. For example, an ethanol output stream from an ethanol plant (or another type of fermentation process) can include a substantial portion of $H_2O$ prior to final distillation. Such $H_2O$ can typically cause only minimal impact on the operation of a fuel cell. Thus, a fermentation mixture of alcohol (or other fermentation product) and water can be used as at least a portion of an anode input stream.

Biogas, or digester gas, is another additional or alternate potential source for an anode input. Biogas may primarily comprise methane and $CO_2$ and is typically produced by the breakdown or digestion of organic matter. Anaerobic bacteria may be used to digest the organic matter and produce the biogas. Impurities, such as sulfur-containing compounds, may be removed from the biogas prior to use as an anode input.

The output stream from an MCFC anode can include $H_2O$, $CO_2$, CO, and $H_2$. Optionally, the anode output stream could also have unreacted fuel (such as $H_2$ or $CH_4$) or inert compounds in the feed as additional output components. Instead of using this output stream as a fuel source to provide heat for a reforming reaction or as a combustion fuel for heating the cell, one or more separations can be performed on the anode output stream to separate the $CO_2$ from the components with potential value as inputs to another process, such as $H_2$ or CO. The $H_2$ and/or CO can be used as a syngas for chemical synthesis, as a source of hydrogen for chemical reaction, and/or as a fuel with reduced greenhouse gas emissions.

Cathode Inputs and Outputs

Conventionally, a molten carbonate fuel cell can be operated based on drawing a desired load while consuming some portion of the fuel in the fuel stream delivered to the anode. The voltage of the fuel cell can then be determined by the load, fuel input to the anode, air and $CO_2$ provided to the cathode, and the internal resistances of the fuel cell. The $CO_2$ to the cathode can be conventionally provided in part by using the anode exhaust as at least a part of the cathode input stream. By contrast, the present invention can use separate/ different sources for the anode input and cathode input. By removing any direct link between the composition of the anode input flow and the cathode input flow, additional options become available for operating the fuel cell, such as to generate excess synthesis gas, to improve capture of carbon dioxide, and/or to improve the total efficiency (electrical plus chemical power) of the fuel cell, among others.

In various aspects, an MCFC can be operated to cause alternative ion transport across the electrolyte for the fuel cell. In order to cause alternative ion transport, the $CO_2$ content of the cathode input stream can be 5.0 vol % or less, or 4.0 vol % or less, such as 1.5 vol % to 5.0 vol %, or 1.5 vol % to 4.0 vol %, or 2.0 vol % to 5.0 vol %, or 2.0 vol % to 4.0 vol %.

One example of a suitable $CO_2$-containing stream for use as a cathode input flow can be an output or exhaust flow from a combustion source. Examples of combustion sources include, but are not limited to, sources based on combustion of natural gas, combustion of coal, and/or combustion of other hydrocarbon-type fuels (including biologically derived fuels). Additional or alternate sources can include other types of boilers, fired heaters, furnaces, and/or other types of devices that burn carbon-containing fuels in order to heat another substance (such as water or air).

Other potential sources for a cathode input stream can additionally or alternatively include sources of bio-produced $CO_2$. This can include, for example, $CO_2$ generated during processing of bio-derived compounds, such as $CO_2$ generated during ethanol production. An additional or alternate example can include $CO_2$ generated by combustion of a bio-produced fuel, such as combustion of lignocellulose. Still other additional or alternate potential $CO_2$ sources can correspond to output or exhaust streams from various industrial processes, such as $CO_2$-containing streams generated by plants for manufacture of steel, cement, and/or paper.

Yet another additional or alternate potential source of $CO_2$ can be $CO_2$-containing streams from a fuel cell. The $CO_2$-containing stream from a fuel cell can correspond to a cathode output stream from a different fuel cell, an anode output stream from a different fuel cell, a recycle stream from the cathode output to the cathode input of a fuel cell, and/or a recycle stream from an anode output to a cathode input of a fuel cell. For example, an MCFC operated in standalone mode under conventional conditions can generate a cathode exhaust with a $CO_2$ concentration of at least about 5 vol %. Such a $CO_2$-containing cathode exhaust could be used as a cathode input for an MCFC operated according to an aspect of the invention. More generally, other types of fuel cells that generate a $CO_2$ output from the cathode exhaust can additionally or alternately be used, as well as other types of $CO_2$-containing streams not generated by a "combustion" reaction and/or by a combustion-powered generator. Optionally but preferably, a $CO_2$-containing stream from another fuel cell can be from another molten carbonate fuel cell. For example, for molten carbonate fuel cells connected in series with respect to the cathodes, the output from the cathode for a first molten carbonate fuel cell can be used as the input to the cathode for a second molten carbonate fuel cell.

In addition to $CO_2$, a cathode input stream can include $O_2$ to provide the components necessary for the cathode reaction. Some cathode input streams can be based on having air as a component. For example, a combustion exhaust stream can be formed by combusting a hydrocarbon fuel in the presence of air. Such a combustion exhaust stream, or another type of cathode input stream having an oxygen content based on inclusion of air, can have an oxygen content of about 20 vol % or less, such as about 15 vol % or less, or about 10 vol % or less. Additionally or alternatively, the oxygen content of the cathode input stream can be at least about 4 vol %, such as at least about 6 vol %, or at about 8 vol %. More generally, a cathode input stream can have a suitable content of oxygen for performing the cathode reaction. In some aspects, this can correspond to an oxygen content of about 5 vol % to about 15 vol %, such as from about 7 vol % to about 9 vol %. For many types of cathode input streams, the combined amount of $CO_2$ and $O_2$ can correspond to less than about 21 vol % of the input stream, such as less than about 15 vol % of the stream or less than about 10 vol % of the stream. An air stream containing oxygen can be combined with a $CO_2$ source that has low oxygen content. For example, the exhaust stream generated by burning coal may include a low oxygen content that can be mixed with air to form a cathode inlet stream.

In addition to $CO_2$ and $O_2$, a cathode input stream can also be composed of inert/non-reactive species such as $N_2$, $H_2O$, and other typical oxidant (air) components. For example, for a cathode input derived from an exhaust from a combustion reaction, if air is used as part of the oxidant source for the combustion reaction, the exhaust gas can include typical components of air such as $N_2$, $H_2O$, and other compounds in minor amounts that are present in air. Depending on the nature of the fuel source for the combustion reaction, additional species present after combustion based on the fuel source may include one or more of $H_2O$, oxides of nitrogen (NOx) and/or sulfur (SOx), and other compounds either present in the fuel and/or that are partial or complete combustion products of compounds present in the fuel, such as CO. These species may be present in amounts that do not poison the cathode catalyst surfaces though they may reduce the overall cathode activity. Such reductions in performance may be acceptable, or species that interact with the cathode catalyst may be reduced to acceptable levels by known pollutant removal technologies.

The amount of $O_2$ present in a cathode input stream (such as an input cathode stream based on a combustion exhaust) can advantageously be sufficient to provide the oxygen needed for the cathode reaction in the fuel cell. Thus, the volume percentage of $O_2$ can advantageously be at least 0.5 times the amount of $CO_2$ in the exhaust. Optionally, as necessary, additional air can be added to the cathode input to provide a sufficient oxidant for the cathode reaction. When some form of air is used as the oxidant, the amount of $N_2$ in the cathode exhaust can be at least about 78 vol %, e.g., at least about 88 vol %, and/or about 95 vol % or less. In some aspects, the cathode input stream can additionally or alternately contain compounds that are generally viewed as contaminants, such as $H_2S$ or $NH_3$. In other aspects, the cathode input stream can be cleaned to reduce or minimize the content of such contaminants.

A suitable temperature for operation of an MCFC can be between about 450° C. and about 750° C., such as at least about 500° C., e.g., with an inlet temperature of about 550° C. and an outlet temperature of about 625° C. Prior to entering the cathode, heat can be added to or removed from the cathode input stream, if desired, e.g., to provide heat for other processes, such as reforming the fuel input for the anode. For example, if the source for the cathode input stream is a combustion exhaust stream, the combustion exhaust stream may have a temperature greater than a desired temperature for the cathode inlet. In such an aspect, heat can be removed from the combustion exhaust prior to use as the cathode input stream. Alternatively, the combustion exhaust could be at a very low temperature, for example after a wet gas scrubber on a coal-fired boiler, in which case the combustion exhaust can be below about 100° C. Alternatively, the combustion exhaust could be from the exhaust of a gas turbine operated in combined cycle mode, in which the gas can be cooled by raising steam to run a steam turbine for additional power generation. In this case, the gas can be below about 50° C. Heat can be added to a combustion exhaust that is cooler than desired.

Additional Molten Carbonate Fuel Cell Operating Strategies

In some aspects, when operating an MCFC to cause alternative ion transport, the anode of the fuel cell can be operated at a traditional fuel utilization value of roughly 60% to 80%. When attempting to generate electrical power, operating the anode of the fuel cell at a relatively high fuel utilization can be beneficial for improving electrical efficiency (i.e., electrical energy generated per unit of chemical energy consumed by the fuel cell).

In some aspects, it may be beneficial to reduce the electrical efficiency of the fuel cell in order to provide other benefits, such as an increase in the amount of $H_2$ provided in the anode output flow. This can be beneficial, for example, if it is desirable to consume excess heat generated in the fuel cell (or fuel cell stack) by performing additional reforming and/or performing another endothermic reaction. For example, a molten carbonate fuel cell can be operated to provide increased production of syngas and/or hydrogen. The heat required for performing the endothermic reforming reaction can be provided by the exothermic electrochemical reaction in the anode for electricity generation. Rather than attempting to transport the heat generated by the exothermic fuel cell reaction(s) away from the fuel cell, this excess heat can be used in situ as a heat source for reforming and/or another endothermic reaction. This can result in more efficient use of the heat energy and/or a reduced need for additional external or internal heat exchange. This efficient production and use of heat energy, essentially in-situ, can reduce system complexity and components while maintaining advantageous operating conditions. In some aspects, the amount of reforming or other endothermic reaction can be selected to have an endothermic heat requirement comparable to, or even greater than, the amount of excess heat generated by the exothermic reaction(s) rather than significantly less than the heat requirement typically described in the prior art.

Additionally or alternately, the fuel cell can be operated so that the temperature differential between the anode inlet and the anode outlet can be negative rather than positive. Thus, instead of having a temperature increase between the anode inlet and the anode outlet, a sufficient amount of reforming and/or other endothermic reaction can be performed to cause the output stream from the anode outlet to be cooler than the anode inlet temperature. Further additionally or alternatively, additional fuel can be supplied to a heater for the fuel cell and/or an internal reforming stage (or other internal endothermic reaction stage) so that the temperature differential between the anode input and the anode output can be smaller than the expected difference based on the relative demand of the endothermic reaction(s) and the combined exothermic heat generation of the cathode combustion reaction and the anode reaction for generating electrical power. In aspects where reforming is used as the endothermic reaction, operating a fuel cell to reform excess fuel can allow for production of increased synthesis gas and/or increased hydrogen relative to conventional fuel cell operation while minimizing the system complexity for heat exchange and reforming. The additional synthesis gas and/or additional hydrogen can then be used in a variety of applications, including chemical synthesis processes and/or collection/repurposing of hydrogen for use as a "clean" fuel.

The amount of heat generated per mole of hydrogen oxidized by the exothermic reaction at the anode can be substantially larger than the amount of heat consumed per mole of hydrogen generated by the reforming reaction. The net reaction for hydrogen in a molten carbonate fuel cell ($H_2 + \frac{1}{2}O_2 \Rightarrow H_2O$) can have an enthalpy of reaction of about −285 kJ/mol of hydrogen molecules. At least a portion of this energy can be converted to electrical energy within the fuel cell. However, the difference (approximately) between the enthalpy of reaction and the electrical energy produced by the fuel cell can become heat within the fuel cell. This quantity of energy can alternatively be expressed as the current density (current per unit area) for the cell multiplied by the difference between the theoretical maximum voltage of the fuel cell and the actual voltage, or <current density>* (Vmax−Vact). This quantity of energy is defined as the "waste heat" for a fuel cell. As an example of reforming, the enthalpy of reforming for methane ($CH_4 + 2H_2O \Rightarrow 4H_2 + CO_2$) can be about 250 kJ/mol of methane, or about 62 kJ/mol of hydrogen molecules. From a heat balance standpoint, each hydrogen molecule electrochemically oxidized can generate sufficient heat to generate more than one hydrogen molecule by reforming. In a conventional configuration, this excess heat can result in a substantial temperature difference from anode inlet to anode outlet. Instead of allowing this excess heat to be used for increasing the temperature in the fuel cell, the excess heat can be consumed by performing a matching amount of the reforming reaction. The excess heat generated in the anode can be supplemented with the excess heat generated by the combustion reaction in the fuel cell. More generally, the excess heat can be consumed by performing an endothermic reaction in the fuel cell anode and/or in an endothermic reaction stage heat integrated with the fuel cell.

Depending on the aspect, the amount of reforming and/or other endothermic reaction can be selected relative to the amount of hydrogen reacted in the anode in order to achieve a desired thermal ratio for the fuel cell. As used herein, the "thermal ratio" is defined as the heat produced by exothermic reactions in a fuel cell assembly (including exothermic reactions in both the anode and cathode) divided by the endothermic heat demand of reforming reactions occurring within the fuel cell assembly. Expressed mathematically, the thermal ratio (TH)=$Q_{EX}/Q_{EN}$, where $Q_{EX}$ is the sum of heat produced by exothermic reactions and $Q_{EN}$ is the sum of heat consumed by the endothermic reactions occurring within the fuel cell. Note that the heat produced by the exothermic reactions can correspond to any heat due to reforming reactions, water gas shift reactions, combustion reactions (i.e., oxidation of fuel compounds) in the cathode, and/or the electrochemical reactions in the cell. The heat generated by the electrochemical reactions can be calculated based on the ideal electrochemical potential of the fuel cell reaction across the electrolyte minus the actual output voltage of the fuel cell. For example, the ideal electrochemical potential of the reaction in an MCFC is believed to be about 1.04 V based on the net reaction that occurs in the cell. During operation of the MCFC, the cell can typically have an output voltage less than 1.04 V due to various losses. For example, a common output/operating voltage can be about 0.7 V. The heat generated can be equal to the electrochemical potential of the cell (i.e. ~1.04 V) minus the operating voltage. For example, the heat produced by the electrochemical reactions in the cell can be ~0.34 V when the output voltage of ~0.7 V is attained in the fuel cell. Thus, in this scenario, the electrochemical reactions would produce ~0.7 V of electricity and ~0.34 V of heat energy. In such an example, the ~0.7 V of electrical energy is not included as part of $Q_{EX}$. In other words, heat energy is not electrical energy.

In various aspects, a thermal ratio can be determined for any convenient fuel cell structure, such as a fuel cell stack, an individual fuel cell within a fuel cell stack, a fuel cell stack with an integrated reforming stage, a fuel cell stack with an integrated endothermic reaction stage, or a combination thereof. The thermal ratio may also be calculated for different units within a fuel cell stack, such as an assembly of fuel cells or fuel cell stacks. For example, the thermal ratio may be calculated for a fuel cell (or a plurality of fuel cells) within a fuel cell stack along with integrated reforming stages and/or integrated endothermic reaction stage elements in sufficiently close proximity to the fuel cell(s) to be integrated from a heat integration standpoint.

From a heat integration standpoint, a characteristic width in a fuel cell stack can be the height of an individual fuel cell stack element. It is noted that the separate reforming stage and/or a separate endothermic reaction stage could have a different height in the stack than a fuel cell. In such a scenario, the height of a fuel cell element can be used as the characteristic height. In this discussion, an integrated endothermic reaction stage can be defined as a stage heat integrated with one or more fuel cells, so that the integrated endothermic reaction stage can use the heat from the fuel cells as a heat source for reforming. Such an integrated endothermic reaction stage can be defined as being positioned less than 10 times the height of a stack element from fuel cells providing heat to the integrated stage. For example, an integrated endothermic reaction stage (such as a reforming stage) can be positioned less than 10 times the height of a stack element from any fuel cells that are heat integrated, or less than 8 times the height of a stack element, or less than 5 times the height of a stack element, or less than 3 times the height of a stack element. In this discussion, an integrated reforming stage and/or integrated endothermic reaction stage that represents an adjacent stack element to a fuel cell element is defined as being about one stack element height or less away from the adjacent fuel cell element.

A thermal ratio of about 1.3 or less, or about 1.15 or less, or about 1.0 or less, or about 0.95 or less, or about 0.90 or less, or about 0.85 or less, or about 0.80 or less, or about 0.75 of less, can be lower than the thermal ratio typically sought in use of MCFC fuel cells. In aspects of the invention, the thermal ratio can be reduced to increase and/or optimize syngas generation, hydrogen generation, generation of another product via an endothermic reaction, or a combination thereof.

In various aspects of the invention, the operation of the fuel cells can be characterized based on a thermal ratio. Where fuel cells are operated to have a desired thermal ratio, a molten carbonate fuel cell can be operated to have a thermal ratio of about 1.5 or less, for example about 1.3 or less, or about 1.15 or less, or about 1.0 or less, or about 0.95 or less, or about 0.90 or less, or about 0.85 or less, or about 0.80 or less, or about 0.75 or less. Additionally or alternatively, the thermal ratio can be at least about 0.25, or at least about 0.35, or at least about 0.45, or at least about 0.50. Further additionally or alternatively, in some aspects the fuel cell can be operated to have a temperature rise between anode input and anode output of about 40° C. or less, such as about 20° C. or less, or about 10° C. or less. Still further additionally or alternatively, the fuel cell can be operated to have an anode outlet temperature that is from about 10° C. lower to about 10° C. higher than the temperature of the anode inlet. Yet further additionally or alternatively, the fuel cell can be operated to have an anode inlet temperature greater than the anode outlet temperature, such as at least about 5° C. greater, or at least about 10° C. greater, or at least about 20° C.

greater, or at least about 25° C. greater. Still further additionally or alternatively, the fuel cell can be operated to have an anode inlet temperature greater than the anode outlet temperature by about 100° C. or less, or about 80° C. or less, or about 60° C. or less, or about 50° C. or less, or about 40° C. or less, or about 30° C. or less, or about 20° C. or less.

Operating a fuel cell with a thermal ratio of less than 1 can cause a temperature drop across the fuel cell. In some aspects, the amount of reforming and/or other endothermic reaction may be limited so that a temperature drop from the anode inlet to the anode outlet can be about 100° C. or less, such as about 80° C. or less, or about 60° C. or less, or about 50° C. or less, or about 40° C. or less, or about 30° C. or less, or about 20° C. or less. Limiting the temperature drop from the anode inlet to the anode outlet can be beneficial, for example, for maintaining a sufficient temperature to allow complete or substantially complete conversion of fuels (by reforming) in the anode. In other aspects, additional heat can be supplied to the fuel cell (such as by heat exchange or combustion of additional fuel) so that the anode inlet temperature is greater than the anode outlet temperature by less than about 100° C. or less, such as about 80° C. or less, or about 60° C. or less, or about 50° C. or less, or about 40° C. or less, or about 30° C. or less, or about 20° C. or less, due to a balancing of the heat consumed by the endothermic reaction and the additional external heat supplied to the fuel cell.

The amount of reforming can additionally or alternately be dependent on the availability of a reformable fuel. For example, if the fuel only comprised $H_2$, no reformation would occur because $H_2$ is already reformed and is not further reformable. The amount of "syngas produced" by a fuel cell can be defined as a difference in the lower heating value (LHV) value of syngas in the anode input versus an LHV value of syngas in the anode output. Syngas produced LHV (sg net)=(LHV(sg out)−LHV(sg in)), where LHV(sg in) and LHV(sg out) refer to the LHV of the syngas in the anode inlet and syngas in the anode outlet streams or flows, respectively. A fuel cell provided with a fuel containing substantial amounts of $H_2$ can be limited in the amount of potential syngas production, since the fuel contains substantial amounts of already reformed $H_2$, as opposed to containing additional reformable fuel. The lower heating value is defined as the enthalpy of combustion of a fuel component to vapor phase, fully oxidized products (i.e., vapor phase $CO_2$ and $H_2O$ product). For example, any $CO_2$ present in an anode input stream does not contribute to the fuel content of the anode input, since $CO_2$ is already fully oxidized. For this definition, the amount of oxidation occurring in the anode due to the anode fuel cell reaction is defined as oxidation of $H_2$ in the anode as part of the electrochemical reaction in the anode.

An example of a method for operating a fuel cell with a reduced thermal ratio can be a method where excess reforming of fuel is performed in order to balance the generation and consumption of heat in the fuel cell and/or consume more heat than is generated. Reforming a reformable fuel to form $H_2$ and/or CO can be an endothermic process, while the anode electrochemical oxidation reaction and the cathode combustion reaction(s) can be exothermic. During conventional fuel cell operation, the amount of reforming needed to supply the feed components for fuel cell operation can typically consume less heat than the amount of heat generated by the anode oxidation reaction. For example, conventional operation at a fuel utilization of about 70% or about 75% produces a thermal ratio substantially greater than 1, such as a thermal ratio of at least about 1.4 or greater, or 1.5 or greater. As a result, the output streams for the fuel cell can be hotter than the input streams. Instead of this type of conventional operation, the amount of fuel reformed in the reforming stages associated with the anode can be increased. For example, additional fuel can be reformed so that the heat generated by the exothermic fuel cell reactions can either be (roughly) balanced by the heat consumed in reforming and/or consume more heat than is generated. This can result in a substantial excess of hydrogen relative to the amount oxidized in the anode for electrical power generation and result in a thermal ratio of about 1.0 or less, such as about 0.95 or less, or about 0.90 or less, or about 0.85 or less, or about 0.80 or less, or about 0.75 or less.

Either hydrogen or syngas can be withdrawn from the anode exhaust as a chemical energy output. Hydrogen can be used as a clean fuel without generating greenhouse gases when it is burned or combusted. Instead, for hydrogen generated by reforming of hydrocarbons (or hydrocarbonaceous compounds), the $CO_2$ will have already been "captured" in the anode loop. Additionally, hydrogen can be a valuable input for a variety of refinery processes and/or other synthesis processes. Syngas can also be a valuable input for a variety of processes. In addition to having fuel value, syngas can be used as a feedstock for producing other higher value products, such as by using syngas as an input for Fischer-Tropsch synthesis and/or methanol synthesis processes.

In some aspects, the reformable hydrogen content of reformable fuel in the input stream delivered to the anode and/or to a reforming stage associated with the anode can be at least about 50% greater than the net amount of hydrogen reacted at the anode, such as at least about 75% greater or at least about 100% greater. Additionally or alternately, the reformable hydrogen content of fuel in the input stream delivered to the anode and/or to a reforming stage associated with the anode can be at least about 50% greater than the net amount of hydrogen reacted at the anode, such as at least about 75% greater or at least about 100% greater. In various aspects, a ratio of the reformable hydrogen content of the reformable fuel in the fuel stream relative to an amount of hydrogen reacted in the anode can be at least about 1.5:1, or at least about 2.0:1, or at least about 2.5:1, or at least about 3.0:1. Additionally or alternately, the ratio of reformable hydrogen content of the reformable fuel in the fuel stream relative to the amount of hydrogen reacted in the anode can be about 20:1 or less, such as about 15:1 or less or about 10:1 or less. In one aspect, it is contemplated that less than 100% of the reformable hydrogen content in the anode inlet stream can be converted to hydrogen. For example, at least about 80% of the reformable hydrogen content in an anode inlet stream can be converted to hydrogen in the anode and/or in an associated reforming stage(s), such as at least about 85%, or at least about 90%. Additionally or alternatively, the amount of reformable fuel delivered to the anode can be characterized based on the Lower Heating Value (LHV) of the reformable fuel relative to the LHV of the hydrogen oxidized in the anode. This can be referred to as a reformable fuel surplus ratio. In various aspects, the reformable fuel surplus ratio can be at least about 2.0, such as at least about 2.5, or at least about 3.0, or at least about 4.0. Additionally or alternately, the reformable fuel surplus ratio can be about 25.0 or less, such as about 20.0 or less, or about 15.0 or less, or about 10.0 or less.

Example 1

A steady state fuel cell model created using a commercially available process modeling platform was used to simulate the cathode flow pattern for two fuel cell configurations. In a first configuration, a single fuel cell having a size of 250 cm$^2$ was modeled. In the second configuration, two fuel cells connected in series in a co-current cross-flow manner with a combined size of 166 cm$^2$ (roughly ⅔ of the area of the single fuel cell) were modeled. For each configuration, the anode input gas into the first stage was modeled as 72% H$_2$, 18% CO$_2$, and 10% H$_2$O on a molar basis. The cathode input gas was modeled as 4% CO$_2$, 10% O$_2$, 10% H$_2$O, and 76% N$_2$ on a molar basis. In each configuration, the first (or only) stage was modeled to operate with a current density of 120 mA/cm$^2$, 85% fuel utilization, and 72% CO$_2$ utilization. For the second configuration, the first stage had a current density of 120 mA/cm$^2$ and a fuel utilization of 85%, while the second stage had a current density of 120 mA/cm$^2$ and a fuel utilization of 70%. The net CO$_2$ capture or utilization across both stages of the second configuration was 72%, so that the same net amount of CO$_2$ was used in the two configurations. However, due to depletion of CO$_2$ in the first configuration, a substantial amount of additional alternative ion transport also occurred. This resulted in a decrease in transference. This accounts for how the larger fuel cell area in the first configuration could have the same current density as the smaller fuel cell area in the second configuration.

Figure 5:
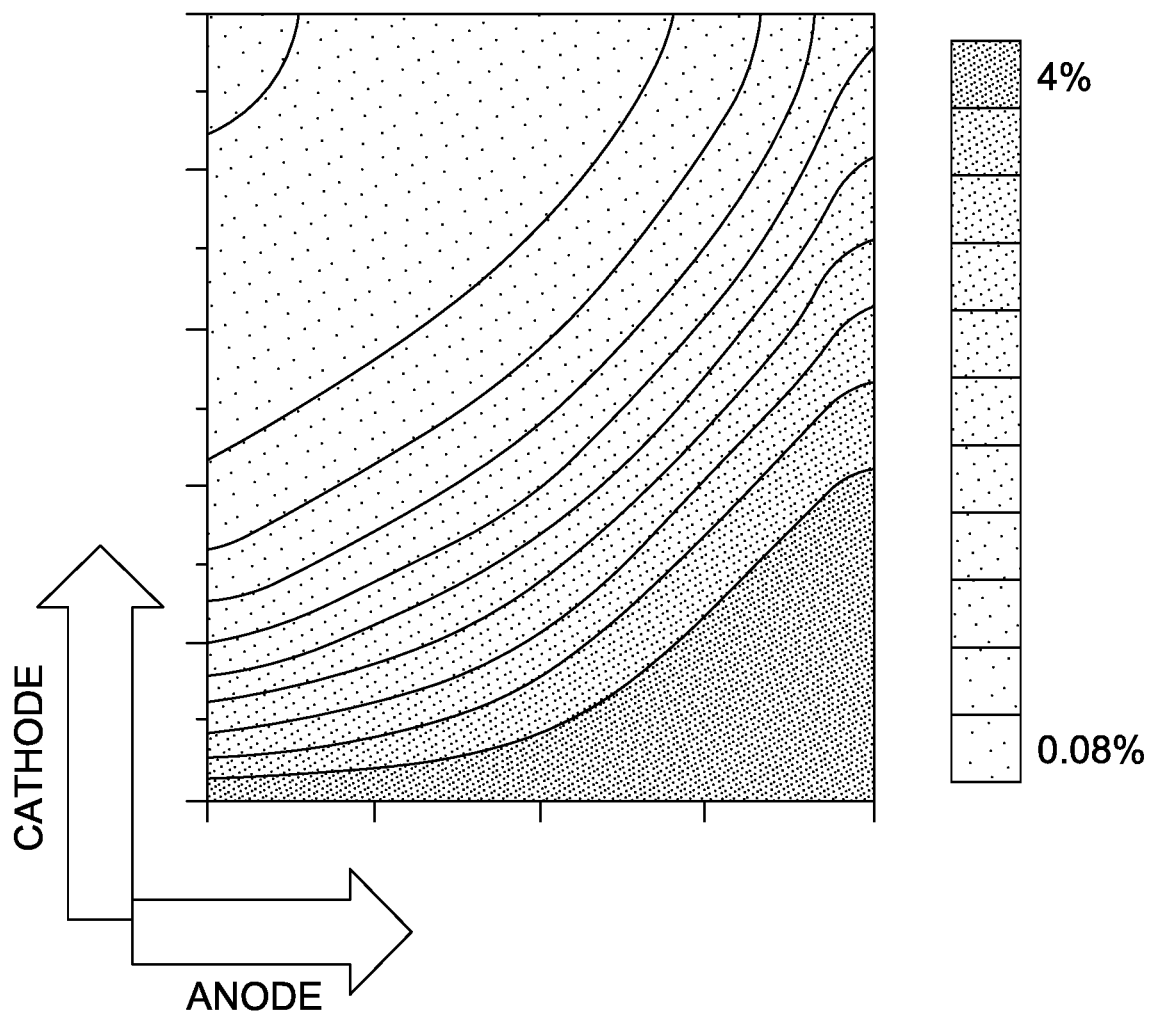
FIG. 5 shows a $CO_2$ concentration pattern in the cathode for a fuel cell operated as a single stage with elevated $CO_2$ utilization.

Based on the flow patterns from modeling the first configuration, FIG. 5 shows the CO$_2$ concentration in the cathode at steady state. The anode flow and cathode flow directions are also indicated in the figure. As shown in FIG. 5, even though the concentration in the cathode output flow is roughly 1.0 mol % (based on 72% CO$_2$ utilization), the CO$_2$ within the cathode is distributed in a highly uneven manner. In particular, at the corner corresponding to the anode inlet and the cathode outlet, the CO$_2$ concentration drops almost to zero, while at the corner corresponding to the cathode inlet and the anode outlet, the CO$_2$ concentration is almost 4.0 mol %. Due to the substantial variation in CO$_2$ concentration across the cathode, the localized area of low CO$_2$ concentration in the cathode can result in an increased amount of alternative ion transport.

Figure 6:
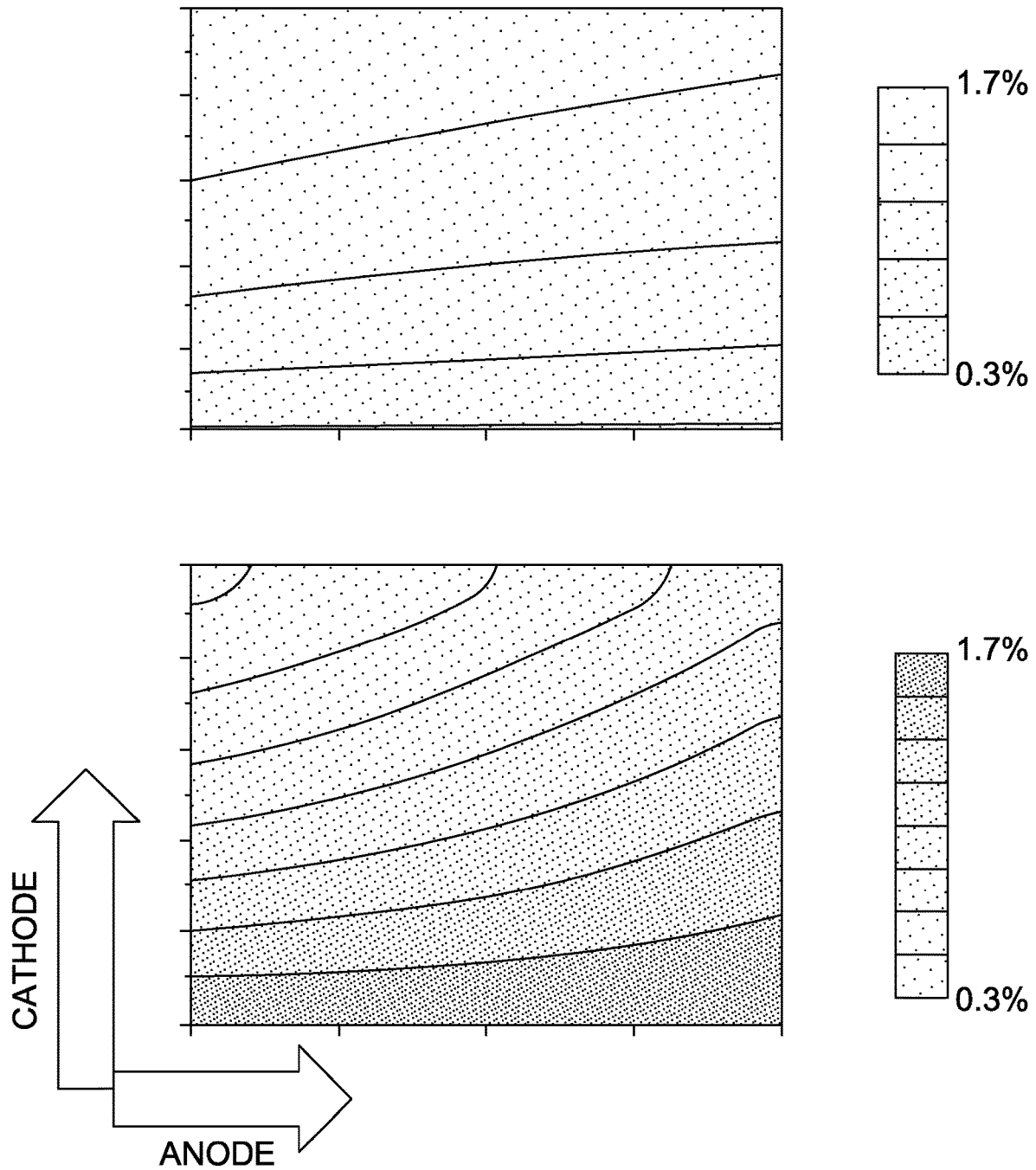
FIG. 6 shows a $CO_2$ concentration pattern in the cathode for two fuel cell stages operated with elevated $CO_2$ utilization.

FIG. 6 shows the cathode CO$_2$ concentration at a steady state for both stages of the second configuration. As shown in FIG. 6, the variation in CO$_2$ concentration is reduced or minimized in both cathode stages. Additionally, in FIG. 5 the lowest concentration corresponds to a CO$_2$ concentration of 0.08 mol % or less. By contrast, the lowest concentration present in FIG. 6 is 0.3 mol %.

Example 2

In this example, two configurations using two molten carbonate fuel cells were used. In the first configuration, the two fuel cells were arranged in parallel, so that both fuel cells received half of the anode input stream and half of the cathode input stream. In the parallel configuration, both fuel cells were operated at the same operating conditions. The operating conditions were selected to achieve a current density of 90 mA/cm$^2$ for each of the parallel fuel cells. In the second configuration, the two fuel cells were arranged in series with regard to the cathode flow. Thus, in the second configuration, each cell received half of the anode input flow, but the first fuel cell received all of the cathode input flow. The cathode exhaust from the first fuel cell was then used as the cathode input stream for the second fuel cell. For the second configuration, the first fuel cell was operated at 120 mA/cm$^2$, while the second fuel cell was operated at 60 mA/cm$^2$. The fuel utilization for both configurations was the same.

As explained above, the net current density for operating the parallel configuration and the series configuration was the same, as the average across both cells in the two configurations was 90 mA/cm$^2$. However, by using the series configuration, the transference was increased from 0.683 for the parallel configuration to 0.693 for the series configuration. This increase in the transference demonstrates that the amount of alternative ion transport was reduced in the series configuration. Thus, even for production of identical current density, staging fuel cells when operating with substantial alternative ion transport can provide an unexpected benefit by reducing or minimizing the amount of alternative ion transport. It is noted, however, that even though the net amount of alternative ion transport was reduced, the operating voltage of the first cell in the series configuration was lower than the operating voltage for the parallel configuration. This indicates that even though the net alternative ion transport was reduced, this reduction is based on an increase in the first stage of the serial configuration followed by a larger decrease in the second stage.

ADDITIONAL EMBODIMENTS

Embodiment 1

A method for producing electricity, the method comprising: introducing an anode input stream comprising H$_2$, a reformable fuel, or a combination thereof into a first anode stage of a plurality of molten carbonate fuel cell stages; introducing a cathode input stream comprising O$_2$ and CO$_2$ into a first cathode stage of the plurality of molten carbonate fuel cell stages; passing a second anode input stream into a second anode stage of the plurality of molten carbonate fuel cell stages; passing an intermediate cathode output into a second cathode stage of the plurality of molten carbonate fuel cell stages; and operating the plurality of molten carbonate fuel cell stages to generate i) electricity at an average current density of 60 mA/cm$^2$ or more, ii) an anode exhaust from the plurality of molten carbonate fuel cell stages comprising H$_2$, CO, and CO$_2$, and iii) a cathode exhaust from the plurality of molten carbonate fuel cell stages comprising a CO$_2$ content of 2.0 vol % or less, a H$_2$O content of 1.0 vol % or more, and an O$_2$ content of 1.0 vol % or more, at least one of the first cathode stage and the second cathode stage being operated at a transference of 0.97 or less.

Embodiment 2

The method of Embodiment 1, wherein the first cathode stage is operated at a transference of 0.97 or less and the second cathode stage is operated at a transference of 0.97 or less.

Embodiment 3

The method of any of the above embodiments, wherein the at least one of the first cathode stage and the second cathode stage is operated at a transference is 0.95 or less, or 0.90 or less.

Embodiment 4

The method of any of the above embodiments, wherein the second anode input stream comprises at least a portion of an intermediate anode output stream, the intermediate anode output optionally comprising an output from the first anode stage.

Embodiment 5

The method of Embodiment 4, further comprising: passing a second anode intermediate output into a third anode stage, the anode exhaust comprising an output from the third anode stage; and passing a second cathode intermediate output into a third cathode stage, the cathode exhaust comprising an output from the third cathode stage, wherein the first anode stage, the second anode stage, and the third anode stage are arranged in a co-current manner or a counter-current manner relative to the first cathode stage, the second cathode stage, and the third cathode stage.

Embodiment 6

The method of any of the above embodiments, wherein a transference in the first cathode stage is different from a transference in the second cathode stage.

Embodiment 7

The method of any of the above embodiments, wherein at least the first anode stage, the second anode stage, the first cathode stage, and the second cathode stage are operated in a co-current, cross-flow manner; or wherein at least the first anode stage, the second anode stage, the first cathode stage, and the second cathode stage are operated in a counter-current, cross-flow manner.

Embodiment 8

The method of any of the above embodiments, wherein the anode exhaust comprises an anode output from the second anode stage, or wherein the cathode exhaust comprises a cathode output from the second cathode stage, or a combination thereof.

Embodiment 9

The method of any of the above embodiments, wherein the intermediate cathode output comprises an output from the first cathode stage.

Embodiment 10

The method of any of the above embodiments, wherein a combined measured $CO_2$ utilization in the first cathode stage and the second cathode stage during the operating of the plurality of molten carbonate fuel cells is 75% or more, or 80% or more.

Embodiment 11

The method of any of the above embodiments, wherein the electricity is generated at an average current density of 100 mA/cm$^2$ or more, or 120 mA/cm$^2$ or more, or 150 mA/cm$^2$ or more.

Embodiment 12

The method of any of the above embodiments, wherein the voltage drop across the cathode is 0.4 V or less, or wherein the electricity is generated at a voltage of 0.55 V or more, or a combination thereof.

Embodiment 13

The method of any of the above embodiments, wherein a fuel utilization in the anode is 60% or more, or wherein a fuel utilization in the anode is 55% or less, or wherein a $H_2$ concentration in the anode exhaust is 5.0 vol % or more, or wherein a combined concentration of $H_2$ and CO in the anode is exhaust is 6.0 vol % or more, or a combination thereof.

Embodiment 14

The method of any of the above embodiments, wherein the fuel cell is operated at a thermal ratio of 0.25 to 1.0; or wherein an amount of the reformable fuel introduced into the first anode stage, an internal reforming element associated with the first anode stage, or a combination thereof, is at least about 75% greater than the amount of hydrogen reacted in the first anode stage to generate electricity; or a combination thereof.

Embodiment 15

The method of any of the above embodiments, wherein the cathode input stream comprises 5.0 vol % or less of $CO_2$, or wherein the cathode exhaust comprises 1.0 vol % or less of $CO_2$, or a combination thereof.

ALTERNATIVE EMBODIMENTS

Alternative Embodiment 1

A method for producing electricity, the method comprising: introducing an anode input stream comprising $H_2$, a reformable fuel, or a combination thereof into a first anode stage of a plurality of molten carbonate fuel cell stages; introducing a cathode input stream comprising $O_2$ and $CO_2$ into a first cathode stage of the plurality of molten carbonate fuel cell stages; passing a second anode input stream into a second anode stage of the plurality of molten carbonate fuel cell stages; passing an intermediate cathode output into a second cathode stage of the plurality of molten carbonate fuel cell stages; and operating the molten carbonate fuel cell stages to generate i) electricity at an average current density of 80 mA/cm$^2$ or more, ii) an anode exhaust from the plurality of molten carbonate fuel cell stages comprising $H_2$, CO, and $CO_2$, and iii) a cathode exhaust from the plurality of molten carbonate fuel cell stages comprising $CO_2$, 1.0 vol % or more of $O_2$, and 1.0 vol % or more of $H_2O$, wherein a combined measured $CO_2$ utilization across the plurality of molten carbonate fuel cell stages is 70% or more (or 75% or more, or 80% or more), and wherein a calculated $CO_2$ utilization in the plurality of molten carbonate fuel cell stages calculated based on the current density is greater than the combined measured $CO_2$ utilization by 5% or more (or 10% or more, or 20% or more).

Alternative Embodiment 2

The method of Alternative Embodiment 1, wherein the cathode input stream comprises 5.0 vol % or less of $CO_2$ (or 4.0 vol % or less), or wherein the cathode exhaust comprises 1.0 vol % or less of $CO_2$, or a combination thereof.

Alternative Embodiment 3

A method for producing electricity, the method comprising: introducing an anode input stream comprising $H_2$, a reformable fuel, or a combination thereof into a first anode stage of a plurality of molten carbonate fuel cell stages; introducing a cathode input stream comprising $O_2$ and 5.0 vol % or less $CO_2$ (or 4.0 vol % or less) into a first cathode stage of the plurality of molten carbonate fuel cell stages; passing a second anode input stream into a second anode stage of the plurality of molten carbonate fuel cell stages; passing an intermediate cathode output into a second cathode stage of the plurality of molten carbonate fuel cell stages; and operating the molten carbonate fuel cell stages to generate i) electricity at an average current density of 80 $mA/cm^2$ or more, ii) an anode exhaust from the plurality of molten carbonate fuel cell stages comprising $H_2$, CO, and $CO_2$, and iii) a cathode exhaust from the plurality of molten carbonate fuel cell stages comprising a $CO_2$ content of 1.0 vol % or less, wherein a combined measured $CO_2$ utilization across the plurality of molten carbonate fuel cell stages is 70% or more (or 75% or more, or 80% or more), and wherein a calculated $CO_2$ utilization in the plurality of molten carbonate fuel cell stages calculated based on the current density is greater than the combined measured $CO_2$ utilization, the calculated $CO_2$ utilization optionally being greater than the combined measured $CO_2$ utilization by 5.0% or more (or 10% or more, or 20% or more).

Alternative Embodiment 4

The method of any of the above alternative embodiments, wherein the second anode input stream comprises at least a portion of an intermediate anode output stream, the intermediate anode output optionally comprising an output from the first anode stage.

Alternative Embodiment 5

The method of Alternative Embodiment 4, further comprising: passing a second anode intermediate output into a third anode stage, the anode exhaust comprising an output from the third anode stage; and passing a second cathode intermediate output into a third cathode stage, the cathode exhaust comprising an output from the third cathode stage, wherein the first anode stage, the second anode stage, and the third anode stage are arranged in a co-current manner or a counter-current manner relative to the first cathode stage, the second cathode stage, and the third cathode stage.

Alternative Embodiment 6

The method of any of the above alternative embodiments, wherein a measured $CO_2$ utilization in the first cathode stage is different from the combined measured $CO_2$ utilization.

Alternative Embodiment 7

The method of any of the above alternative embodiments, wherein at least the first anode stage, the second anode stage, the first cathode stage, and the second cathode stage are operated in a co-current, cross-flow manner; or wherein at least the first anode stage, the second anode stage, the first cathode stage, and the second cathode stage are operated in a counter-current, cross-flow manner.

Alternative Embodiment 8

The method of any of the above alternative embodiments, wherein the anode exhaust comprises an anode output from the second anode stage, or wherein the cathode exhaust comprises a cathode output from the second cathode stage, or a combination thereof.

Alternative Embodiment 9

The method of any of the above alternative embodiments, wherein the intermediate cathode output comprises an output from the first cathode stage.

Alternative Embodiment 10

The method of any of the above alternative embodiments, wherein the electricity is generated at a current density of 120 $mA/cm^2$ or more (or 150 $mA/cm^2$ or more).

Alternative Embodiment 11

The method of any of the above alternative embodiments, wherein the voltage drop across the cathode is 0.4 V or less, or wherein the electricity is generated at a voltage of 0.55 V or more, or a combination thereof.

Alternative Embodiment 12

The method of any of the above alternative embodiments, wherein a fuel utilization in the anode is 60% or more, or wherein a fuel utilization in the anode is 55% or less.

Alternative Embodiment 13

The method of any of the above alternative embodiments, wherein a $H_2$ concentration in the anode exhaust is 5.0 vol % or more, or wherein a combined concentration of $H_2$ and CO in the anode is exhaust is 6.0 vol % or more, or a combination thereof.

Alternative Embodiment 14

The method of any of the above alternative embodiments, wherein the fuel cell is operated at a thermal ratio of about 0.25 to about 1.0; or wherein an amount of the reformable fuel introduced into the first anode stage, an internal reforming element associated with the first anode stage, or a combination thereof, is at least about 75% greater than the amount of hydrogen reacted in the first anode stage to generate electricity; or a combination thereof.

All numerical values within the detailed description and the claims herein are modified by "about" or "approximately" the indicated value, and take into account experimental error and variations that would be expected by a person having ordinary skill in the art.

Although the present invention has been described in terms of specific embodiments, it is not necessarily so limited. Suitable alterations/modifications for operation under specific conditions should be apparent to those skilled in the art. It is therefore intended that the following claims be interpreted as covering all such alterations/modifications that fall within the true spirit/scope of the invention.

The invention claimed is:

1. A method for producing electricity, the method comprising:
    introducing an anode input stream comprising $H_2$, a reformable fuel, or a combination thereof into a first anode stage of a plurality of molten carbonate fuel cell stages;

introducing a cathode input stream comprising $O_2$ and $CO_2$ into a first cathode stage of the plurality of molten carbonate fuel cell stages;

passing a second anode input stream into a second anode stage of the plurality of molten carbonate fuel cell stages;

passing an intermediate cathode output into a second cathode stage of the plurality of molten carbonate fuel cell stages; and operating the plurality of molten carbonate fuel cell stages to generate i) electricity at an average current density of 60 mA/cm$^2$ or more with respect to one or more fuel cell stages of the plurality of molten carbonate fuel cell stages, ii) an anode exhaust from the plurality of molten carbonate fuel cell stages comprising $H_2$, CO, and $CO_2$, and iii) a cathode exhaust from the plurality of molten carbonate fuel cell stages comprising a $CO_2$ content of 2.0 vol % or less, a $H_2O$ content of 1.0 vol % or more, and an $O_2$ content of 1.0 vol % or more, at least one of the first cathode stage and the second cathode stage being operated at a transference of 0.97 or less.

2. The method of claim 1, wherein the at least one of the first cathode stage and the second cathode stage is operated at a transference of 0.95 or less.

3. The method of claim 1, wherein the plurality of molten carbonate fuel cell stages are operated at a combined transference of 0.97 or less.

4. The method of claim 1, wherein the second anode input stream comprises at least a portion of an intermediate anode output stream.

5. The method of claim 4, wherein the intermediate anode output comprises an output from the first anode stage.

6. The method of claim 5, further comprising:

passing a second anode intermediate output into a third anode stage, the anode exhaust comprising an output from the third anode stage; and passing a second cathode intermediate output into a third cathode stage, the cathode exhaust comprising an output from the third cathode stage, wherein the first anode stage, the second anode stage, and the third anode stage are arranged in a co-current manner or a counter-current manner relative to the first cathode stage, the second cathode stage, and the third cathode stage.

7. The method of claim 1, wherein a transference in the first cathode stage is different from a transference in the second cathode stage.

8. The method of claim 1, wherein at least the first anode stage, the second anode stage, the first cathode stage, and the second cathode stage are operated in a co-current, cross-flow manner.

9. The method of claim 1, wherein at least the first anode stage, the second anode stage, the first cathode stage, and the second cathode stage are operated in a counter-current, cross-flow manner.

10. The method of claim 1, wherein the anode exhaust comprises an anode output from the second anode stage, or wherein the cathode exhaust comprises a cathode output from the second cathode stage, or a combination thereof.

11. The method of claim 1, wherein the intermediate cathode output comprises an output from the first cathode stage.

12. The method of claim 1, wherein a combined measured $CO_2$ utilization in the first cathode stage and the second cathode stage during the operating of the plurality of molten carbonate fuel cells is 75% or more.

13. The method of claim 1, wherein the electricity is generated at a current density of 120 mA/cm$^2$ or more with respect to one or more fuel cell stages of the plurality of molten carbonate fuel cell stages.

14. The method of claim 1, wherein the voltage drop across the first cathode stage, the second cathode stage, or both is 0.4 V or less, or wherein the electricity is generated at a voltage of 0.55 V or more, or a combination thereof.

15. The method of claim 1, wherein a fuel utilization in the first anode stage, the second anode stage, or both is 60% or more, or wherein a fuel utilization in the first anode stage, the second anode stage, or both is 55% or less.

16. The method of claim 1, wherein a $H_2$ concentration in the anode exhaust is 5.0 vol % or more, or wherein a combined concentration of $H_2$ and CO in the anode is exhaust is 6.0 vol % or more, or a combination thereof.

17. The method of claim 1, wherein the plurality of molten carbonate fuel cell stages is operated at a thermal ratio of 0.25 to 1.0.

18. The method of claim 1, wherein an amount of the reformable fuel introduced into the first anode stage, an internal reforming element associated with the first anode stage, or a combination thereof, is at least about 75% greater than the amount of hydrogen reacted in the first anode stage to generate electricity.

19. The method of claim 1, wherein the cathode input stream comprises 5.0 vol % or less of $CO_2$, or wherein the cathode exhaust comprises 1.0 vol % or less of $CO_2$, or a combination thereof.

* * * * *